United States Patent
Chen et al.

(10) Patent No.: US 10,409,463 B2
(45) Date of Patent: Sep. 10, 2019

(54) FORKING DIGITAL CONTENT ITEMS BETWEEN DIGITAL TOPICAL ENVIRONMENTS

(71) Applicant: Google LLC, Mountain View, CA (US)

(72) Inventors: Dongfang Chen, Sunnyvale, CA (US); Maor Roytman, San Jose, CA (US); Ariana Nicolay, San Francisco, CA (US); Lukasz Wroblewski, San Jose, CA (US)

(73) Assignee: Google LLC, Mountain View, CA (US)

( * ) Notice: Subject to any disclaimer, the term of this patent is extended or adjusted under 35 U.S.C. 154(b) by 90 days.

(21) Appl. No.: 15/396,386

(22) Filed: Dec. 30, 2016

(65) Prior Publication Data

US 2017/0329478 A1 Nov. 16, 2017

Related U.S. Application Data

(60) Provisional application No. 62/336,564, filed on May 13, 2016.

(51) Int. Cl.
*H04W 4/21* (2018.01)
*G06F 3/0484* (2013.01)
(Continued)

(52) U.S. Cl.
CPC .......... *G06F 3/0484* (2013.01); *G06F 3/0482* (2013.01); *G06F 16/9535* (2019.01); *H04L 67/10* (2013.01); *H04W 4/21* (2018.02)

(58) Field of Classification Search
CPC ................ G06F 3/0484; G06F 3/0482; G06F 17/30867; H04L 67/10; H04L 51/32; H04W 4/21
See application file for complete search history.

(56) References Cited

U.S. PATENT DOCUMENTS

| | | |
|---|---|---|
| 6,408,298 B1 | 6/2002 | Van et al. |
| 9,024,747 B1 | 5/2015 | Faaborg et al. |
| | (Continued) | |

FOREIGN PATENT DOCUMENTS

| | | |
|---|---|---|
| EP | 2 636 017 | 9/2013 |
| WO | 2015/126940 | 8/2015 |
| WO | 2016/025169 | 2/2016 |

OTHER PUBLICATIONS

International Search Report and Written Opinion for International Patent Application No. PCT/US2016/069630, dated Feb. 23, 2017, 15 pgs.

(Continued)

*Primary Examiner* — Shen Shiau
(74) *Attorney, Agent, or Firm* — Fish & Richardson P.C.

(57) ABSTRACT

The technology described herein is capable of generating and presenting graphical user interfaces for displaying shared content, configuring space objects (also simply called spaces), posting digital content items to various spaces, inviting other users to contribute digital content items to various spaces, forking digital content items posted in one space or post object to another space or post object, contextual searching, posting rich comments in association with a post including graphical and textual data, and so forth. Further, the technology may provide suggestive search based on the spaces associated with a user, generate and exchange data with other nodes on a computer network, generate notification data including notifications reflecting updates posted to spaces by various users, and coalesce related comments to reduce number of notifications that each user receives and/or through which a user may have to navigate or scroll through.

20 Claims, 19 Drawing Sheets

(51) Int. Cl.
*G06F 3/0482* (2013.01)
*G06F 16/9535* (2019.01)
*H04L 29/08* (2006.01)

(56) References Cited

U.S. PATENT DOCUMENTS

| | | | |
|---|---|---|---|
| 9,256,859 B2 | 2/2016 | Olsen et al. | |
| 9,792,643 B1* | 10/2017 | Masterman | G06Q 10/083 |
| 9,892,000 B2* | 2/2018 | Kapoor | G06F 16/162 |
| 2003/0014482 A1* | 1/2003 | Toyota | G06Q 10/10 |
| | | | 709/203 |
| 2004/0030753 A1 | 2/2004 | Horvitz | |
| 2006/0085486 A1* | 4/2006 | Thanu | G06F 17/246 |
| 2007/0050726 A1* | 3/2007 | Wakai | G06F 3/0486 |
| | | | 715/769 |
| 2007/0198534 A1 | 8/2007 | Hon et al. | |
| 2009/0322790 A1 | 12/2009 | Behar et al. | |
| 2010/0058417 A1 | 3/2010 | Rondeau et al. | |
| 2010/0153857 A1 | 6/2010 | Sanchez et al. | |
| 2011/0055688 A1* | 3/2011 | Isidore | G06F 9/543 |
| | | | 715/255 |
| 2011/0161987 A1 | 6/2011 | Huang et al. | |
| 2012/0102114 A1 | 4/2012 | Dunn et al. | |
| 2013/0066963 A1 | 3/2013 | Odio et al. | |
| 2014/0237387 A1 | 8/2014 | Ryall et al. | |
| 2015/0039566 A1* | 2/2015 | Baumann | G06F 9/451 |
| | | | 707/684 |
| 2015/0180914 A1 | 6/2015 | Welinder et al. | |
| 2017/0329467 A1* | 11/2017 | Chen | G06F 3/0482 |
| 2017/0329478 A1 | 11/2017 | Chen et al. | |

OTHER PUBLICATIONS

International Search Report and Written Opinion for International Patent Application No. PCT/US2016/069631, dated Mar. 6, 2017, 14 pgs.

* cited by examiner

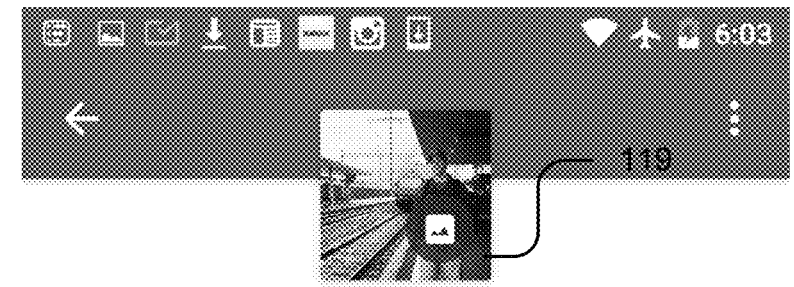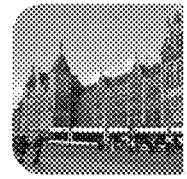
Figure 1C 142
143
144
   
144   145a   145b   145c   145d
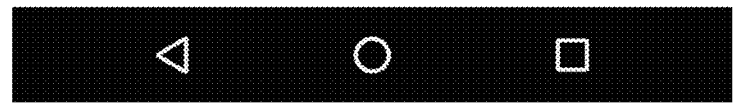
Figure 1I

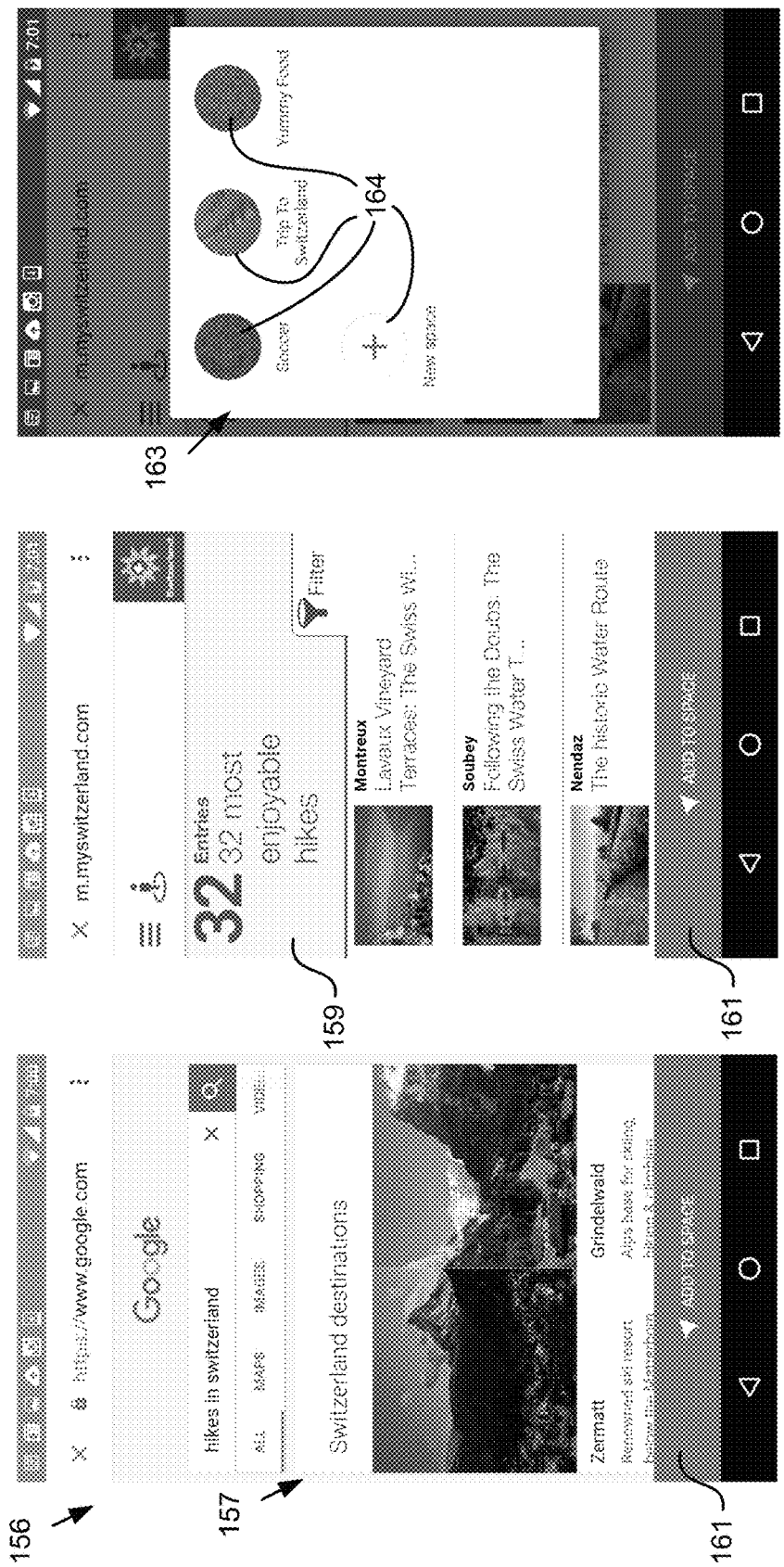

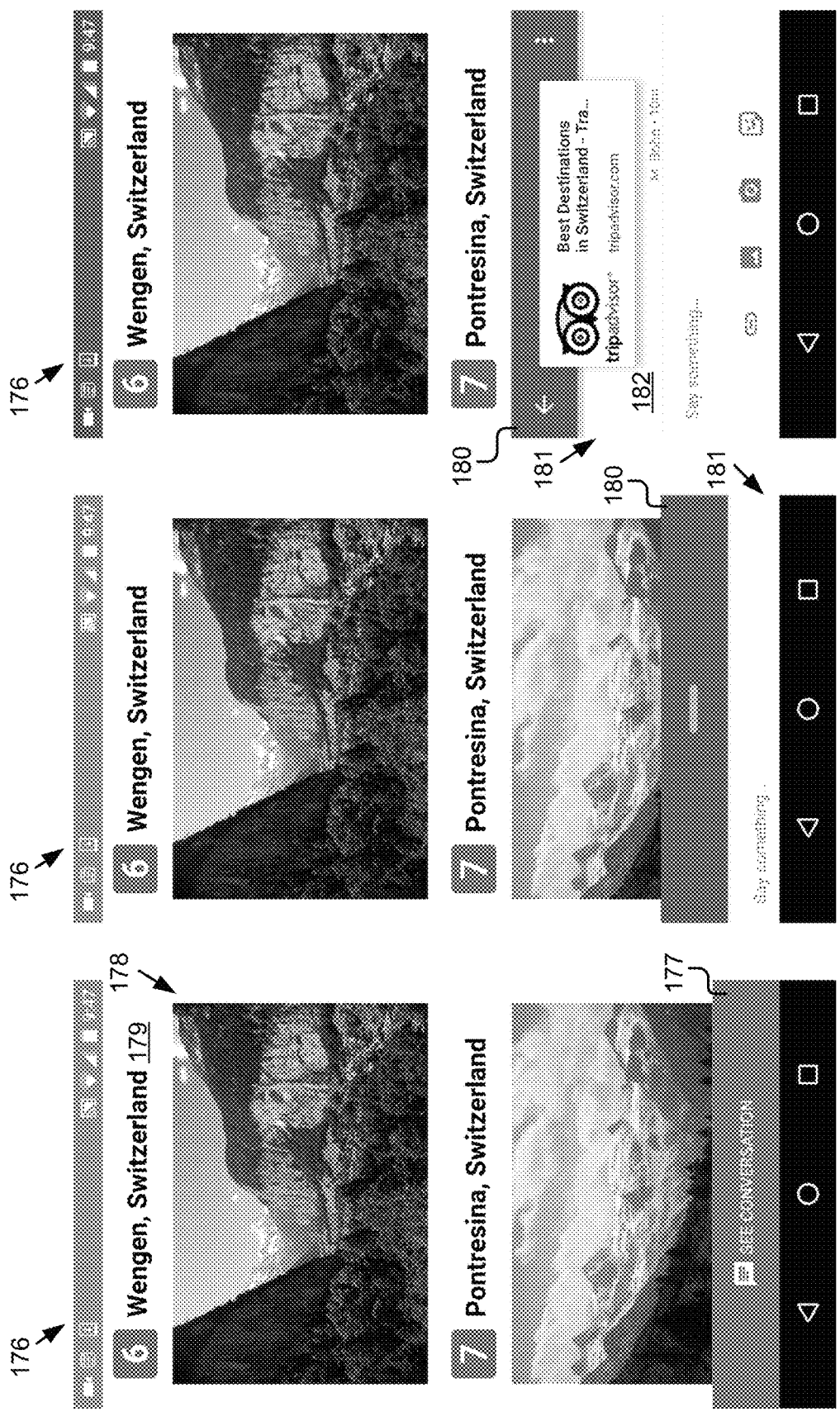

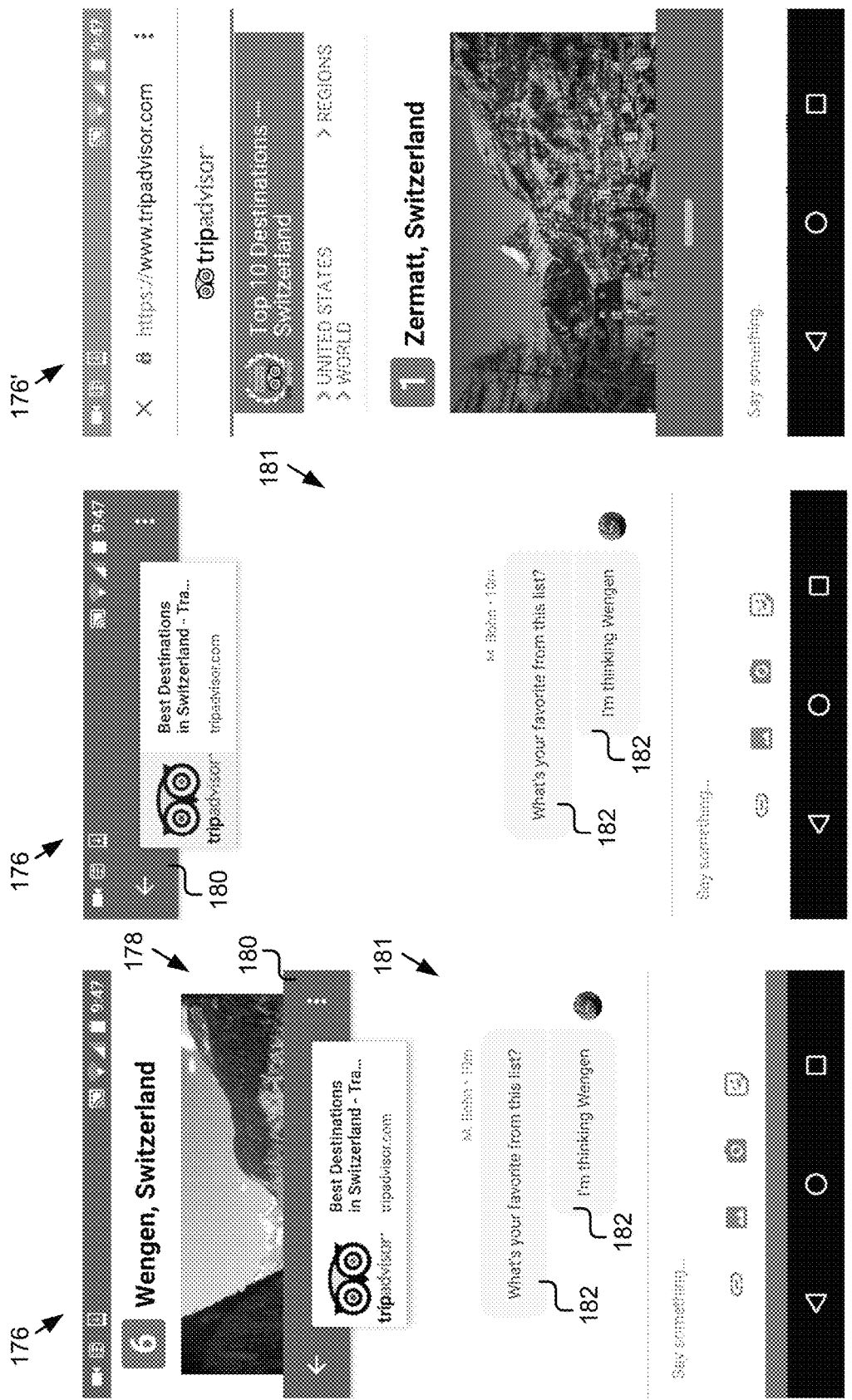

FORKING DIGITAL CONTENT ITEMS BETWEEN DIGITAL TOPICAL ENVIRONMENTS

CROSS-REFERENCE TO RELATED APPLICATIONS

The present application claims priority, under 35 U.S.C. § 119(e), to U.S. Provisional Patent Application No. 62/336,564, filed May 13, 2016, entitled "Interactive Sharing of Digital Content," which is incorporated by reference in its entirety.

BACKGROUND

The present disclosure relates to interaction with digital content.

Users are increasingly viewing and sharing network-accessible digital content using various websites and native applications. However, while some existing content sharing platforms allow for users to post digital content in a content repository of their own profiles or the content repositories of other users for viewing and consumption by other users, the platforms lack tools for organizing that digital content or providing segmented conversation threads for the posted digital content. As a result, digital content that is posted generally becomes increasingly obscured by more recent digital content.

SUMMARY

One innovative aspect of the subject matter described in this disclosure may be embodied in a computer-implemented method comprising: receiving a first input, from a user via an input device of a client device, the first input including an instruction to fork content from a source space embodying a first virtual content sharing environment associated with a first topic; receiving a second input, from the user via the input device of the client device, describing a destination space embodying a second virtual content sharing environment associated with a second topic; determining a set of digital content items to move from the source space embodying the first virtual content sharing environment associated with the first topic to the destination space embodying the second virtual content sharing environment associated with the second topic; populating the destination space, embodying the second virtual content sharing environment associated with the second topic, with the set of digital content items; and removing from the source space, embodying the first virtual content sharing environment associated with the first topic, the set of digital content items.

In general, another innovative aspect of the subject matter described in this disclosure may be embodied in a computer system comprising: one or more computer processors; one or more computer memories storing instructions that, when executed by the one or more computer processors, cause the computer system to perform operations comprising: receiving a first input from a user via an input device, the first input including an instruction to fork content from a source space embodying a first virtual content sharing environment associated with a first topic; receiving a second input, from the user via the input device, describing a destination space embodying a second virtual content sharing environment associated with a second topic; determining a set of digital content items to move from the source space embodying the first virtual content sharing environment associated with the first topic to the destination space embodying the second virtual content sharing environment associated with the second topic; populating the destination space, embodying the second virtual content sharing environment associated with the second topic, with the set of digital content items; and removing from the source space, embodying the first virtual content sharing environment associated with the first topic, the set of digital content items.

These and other implementations may each optionally include one or more of the following features: rendering, for presentation on a plurality of displays of a plurality of client devices, digital content item interaction (DCII) interfaces comprising a first space object in which digital content items are postable by users, the first space object reflecting the source space; and receiving, from each of the client devices of the plurality via user interaction with the DCII interfaces, one or more digital content items associated with the first space object that describe a topic different from the topic of the first space object, the one or more digital content items comprising the set of digital content items to move, that the second topic of the destination space is related to topic of the one or more digital content items; that the set of digital content items include one or more of a post object and a comment object unrelated to the first topic; rendering a content item selection interface presenting digital content items included in the source space and including user-selectable interface elements for identifying which specific digital content items to move; receiving, from the user via the input device of the client device, a third input selecting the set of digital content items to move from among the digital content items presented in the content item selection interface, that the set of digital content items to move are determined based on the third input; the set of digital content items to move include a post object and one or more comments submitted responsive to posting of the post object; receiving the second input describing the destination space includes rendering for display a space creation interface providing user interface elements to create the destination space including an interface element for inputting the second topic and for pre-populating the destination space with digital content items; receiving, via interaction by the user with the space creation interface using the input device, input defining the second topic for the destination space; generating a destination space object embodying the destination space using the input defining the second topic for the destination space; storing the destination space object in a non-transitory data store; receiving the second input describing the destination space includes rendering for display a space selection interface providing user interface elements to select the destination space from among one or more pre-existing spaces and for pre-populating the destination space with digital content items; and storing authorization data granting permission to a set of users to access the destination space and to post digital content items to the destination space, the set of users already having permission to post digital content items to the source space.

Other implementations of one or more of these and other aspects include corresponding systems, apparatus, computer readable media, and computer program products, configured to perform the actions of methods, encoded on non-transitory computer storage devices.

Various features, advantages, and technical effects of the technology are described throughout this disclosure. It should be understood that the language used in the present disclosure has been principally selected for readability and instructional purposes, and not to limit the scope of the subject matter disclosed herein.

BRIEF DESCRIPTION OF THE DRAWINGS

The disclosure is illustrated by way of example, and not by way of limitation in the figures of the accompanying drawings in which like reference numerals are used to refer to similar elements.

DESCRIPTION

Figure 1A:
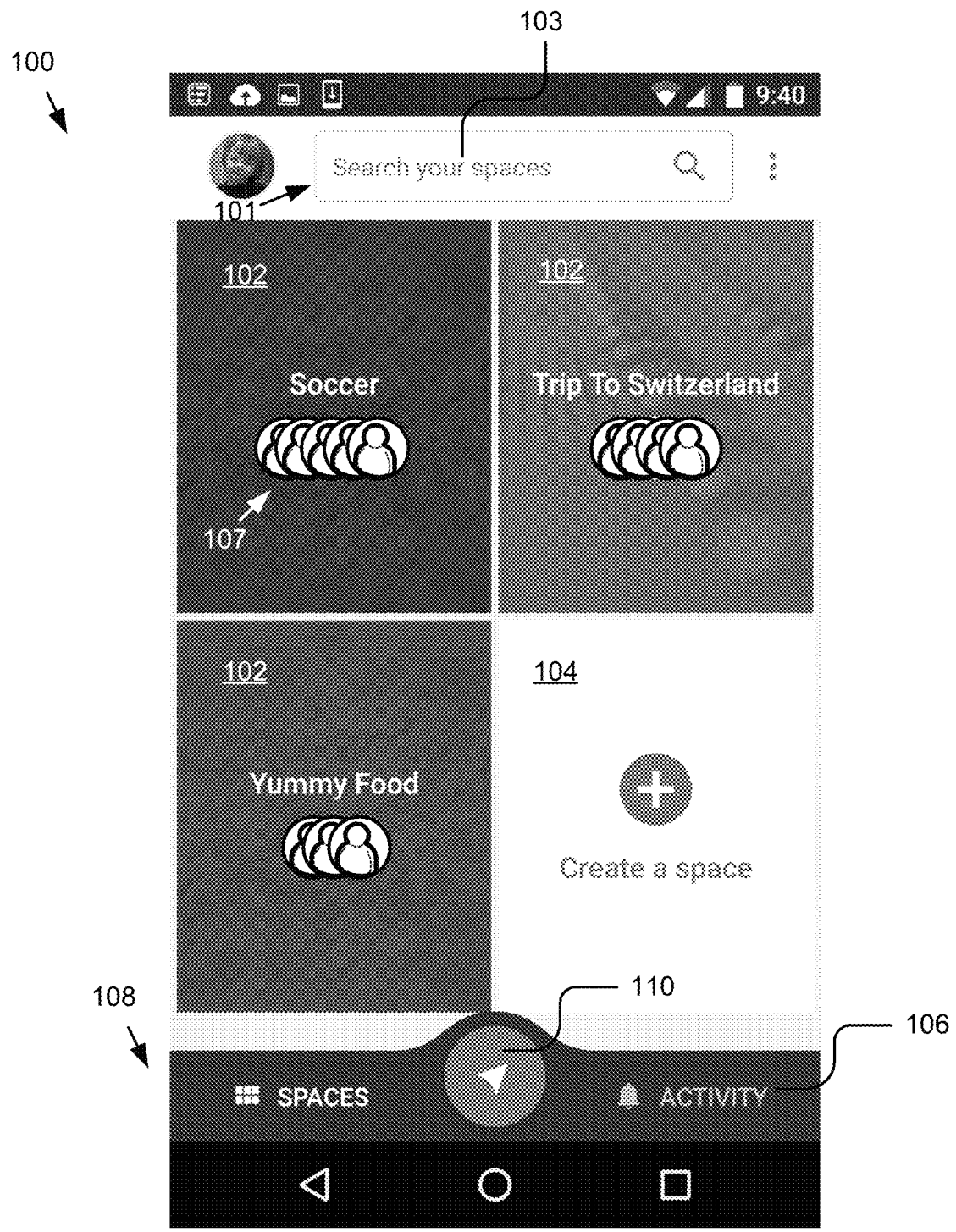
FIGS. 1A-1X are graphical representations of example graphical user interfaces for sharing and interacting with digital content.

The technology described in this application provides a platform for users to conveniently share, collaborate on, and interact with digital content using spaces. A space, or space object, represents a distinct virtual environment configured to store, organize, and provide collaboration on digital content items submitted by user(s) associated with the space. A space may include a title field, which may be populated by a user (e.g., creator of the space) to reflect a topic for the space. Other graphical aspects of the space may also be user-configurable, such as a color theme for the space, background image(s), etc. The user may share the space with other users, who in turn may post digital content items to the space, such as post objects, comments objects related to post objects, etc.

A post object is an object posted by a user in association with a particular space object, and about which users associated with the space can collaborate. A post object includes one or more digital content items. In some implementations, the digital content item may include an electronic file that may be stored and hosted by a server that is accessible via a network, such as the Internet. The post object may reference that file via an electronic link. An example electronic link may include a uniform resource locator (URL), although other suitable electronic links are also possible and contemplated. In some implementations, the electronic file may be user-generated and submitted. For instance, the digital content item may include an image file (e.g., photo) or video file (e.g., video) the user captured using an electronic device (e.g., a mobile phone camera). In some implementations, the digital content item may include text, characters, graphics, and/or other information input by a user using an editor interface. Other variations are also possible and contemplated.

A post object may include metadata about the digital content item, such as a graphical image representing the item (e.g., thumbnail, icon, etc.), date of creation, author, owner, title, description, etc. A post object may be linked to a discussion thread including comment(s) submitted by users of the space object in which the post object is included. A comment object (also called a comment) may comprise textual and/or graphical data. Comments including graphical data, or graphical data and textual data, are sometimes referred to as rich content.

In some typical implementations, the digital content items posted to a space, such as those included in post objects, comment objects, etc., relate to the topic of the space, although in further implementations various digital content items posted to a given space may relate to topics other than the designated space topic. As an example, a user may set up a space to organize various digital content items, such as URLs to various webpages, online video files, online audio files, local video files, local audio files, and/or text authored by the user, etc., that the user may find or generate that relate to a given topic. The user may send electronic messages to other users using various electronic communication mediums inviting those users to access the space and contribute related digital content items. Example electronic communication mediums include, but are not limited to, text messaging platforms (e.g., SMS, MMS, etc.), instant messaging platforms, email servers, social networking platforms, microblogs, webpages, etc.

Figure 5:
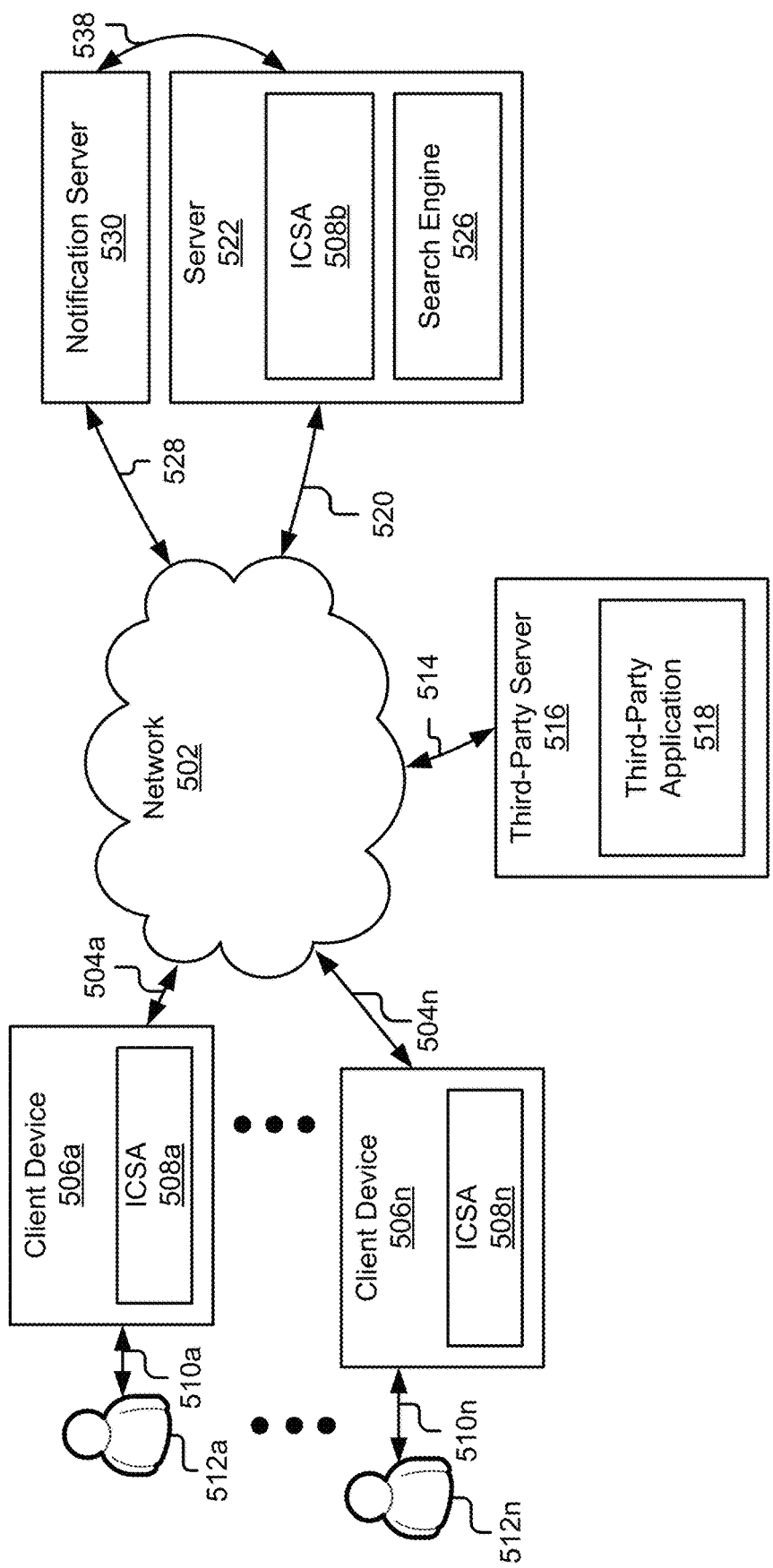
FIG. 5 is a block diagram of an example system for interactive sharing of digital content.

The technology includes an interactive content sharing application (ICSA), such as ICSA 508 depicted in FIG. 5, for example, which is executable to generate and present graphical user interfaces for displaying shared content, configuring space objects (also simply called spaces), posting digital content items to various spaces, inviting other users to contribute digital content items to various spaces, forking digital content items posted in one space or post object to another space or post object, contextual searching, posting rich comments in association with a post object including graphical and textual data, and so forth. In some typical implementations, a multiplicity of users may interact with separate instances of the ICSA to post digital content items to a given space. Further, the technology may provide suggestive search based on the spaces associated with a user, generate and exchange data with other nodes on a computer network, generate notification data including notifications reflecting updates posted to spaces by various users, and coalesce related comments to reduce number of notifications that each user receives and/or through which a user may have to navigate or scroll through.

Instances of the ICSA 508 may be executable to generate and exchange data with other nodes on a computer network, such as the network 502 depicted in FIG. 5. In some implementations, the ICSA 508 may be executable to generate notification data including notifications reflecting updates posted to spaces by various users. Notifications for a given user may be received, processed, and presented by a client-side instance of the ICSA 508, the operating system of the client device (e.g., as push notifications), or another application. Further, instances of the ICSA 508 may be executable to coalesce related comments to reduce number of notifications that each user receives and/or through which a user may have to navigate or scroll through, and so forth.

A user may access an instance of the ICSA 508 on a client device (e.g., client device 506a, 506n, etc.). In some implementations, the instance of the ICSA 508 includes code operable in a web browser, a native application (e.g., mobile app), a combination of both, etc. As further examples, various instances of the ICSA (e.g., 508a, 508b, . . . 508n) may embody a distributed application accessible via an end-point on the network 502, such as via a web site accessible via a browser, via an application accessible via a browser, via one or more apps downloaded from an application marketplace, other native applications, a combination of the foregoing, etc., and may be operable by respective client devices, such as client devices 506a . . . 506n, as shown in FIG. 5 and described in further detail below. In some cases, an instance of the ICSA 508 may be embodied by a software extension to an existing application, such as an internet browser, an API, etc.

In various implementations, an instance of the ICSA 508 may render for presentation the example digital content item interaction graphical user interfaces depicted in FIGS. 1A-1X.

FIG. 1A in particular is a graphical user interface 100 for interacting with spaces. As shown, the interface 100 may include one or more user-selectable graphical elements 102, such as graphical tiles, each representing a distinct space accessible by the user. For instance, in the depicted example, the user has either setup or been provided access to three different spaces: Soccer, Trip to Switzerland, and Yummy Food. The user may select any one of the tiles 102 to view the contents of the space associated with the tile 102.

Figure 1B:
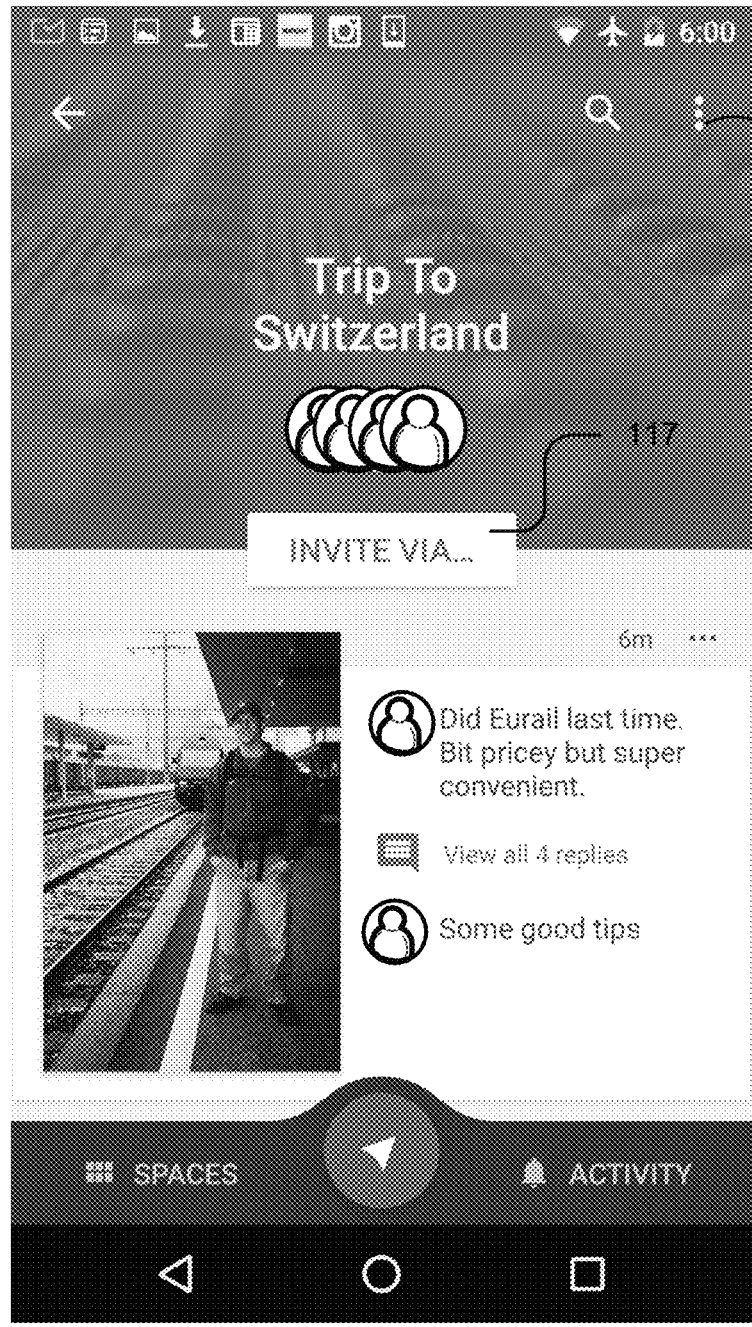

For example, upon selecting the graphical element 102 labeled "Trip to Switzerland," the ICSA 508 generates and displays a corresponding space interface 114 as shown in FIG. 1B, which displays the various digital content items submitted by the users associated with the space. In some implementations, the space interface 114 may include a scroll region 115 which the user may scroll through to view the various contents of the space. For instance, as shown in FIG. 1G, the interface 114 may include a plurality of post objects 113a . . . 113n (also simply referred to as 113) and the user may scroll through the post objects by inputting a scroll command (e.g., swipe gesture using a touch interface, soft and/or hard cursor keys, a scroll bar, etc.). More particularly, FIG. 1G depicts a continuation of the space interface 114 with an initial post 113a scrolled upward and a subsequent post 113n displayed.

In some implementations, the posts 113 depicted by the space interface 114 may be summaries of the actual post objects and the viewing user may select a given post 113 to access a post interface, such as the post interface 118 shown in FIG. 1C. The post interface 118 may include the details associated with the post object, such as the electronic file(s) 119 comprising the post and comment(s) made by the users associated with the space. Using the post interface 118, users may submit additional comments, links, image files, video files, etc., for inclusion in the comment thread associated with the post object (e.g., by selecting and providing input via corresponding user-selectable interface elements 121a, 121b, 121c, and 121d (also simply called 121)). For example, using the comment editing region 120 of the interface 118, the user may input text via a text box and browse and select digital content items to post in a comment by selecting an appropriate user-selectable digital content item addition element 121 and using an embedded search engine, a file browser, etc., displayed responsive to such a selection. As a further example, the comment editing region 120 may also include an emoticon selector selectable via the interface 118 to input a graphical emoticon as a/in association with a comment.

Returning to FIG. 1B, in some implementations, the space interface 114 may include additional configuration options, such as an option to configure the name of the space, customize the look the space, mute the space, delete the space, etc. For example, responsive to the selection of an additional options interface element 125, as shown in FIG. 1D, the space interface 114 may include a drop-down menu 124 including such options.

Figure 1E:
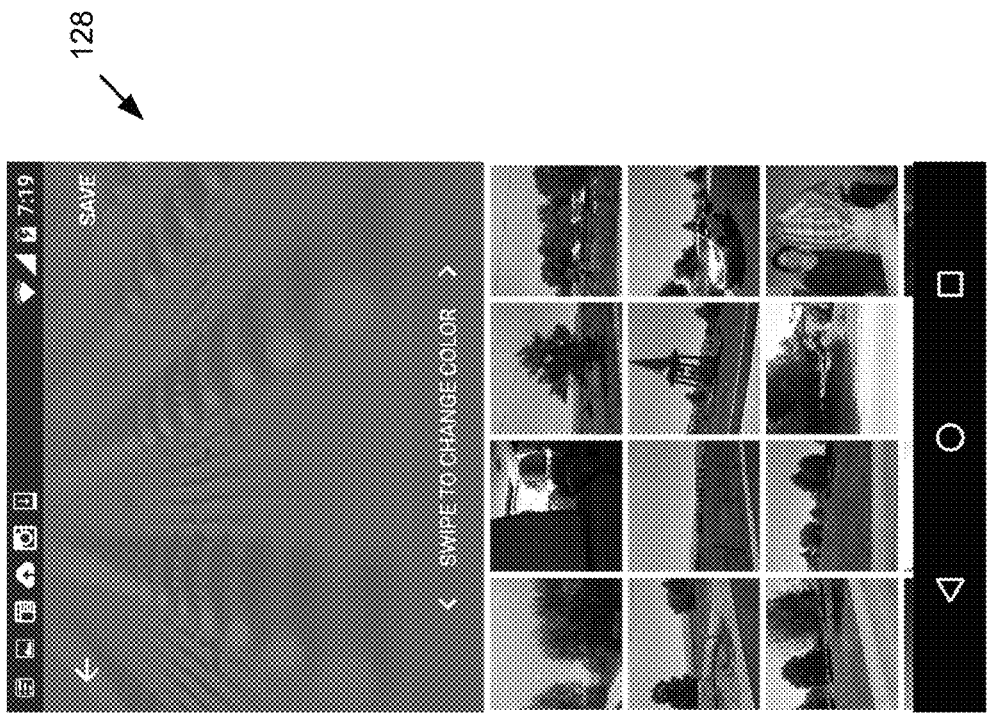
Figure 1D:
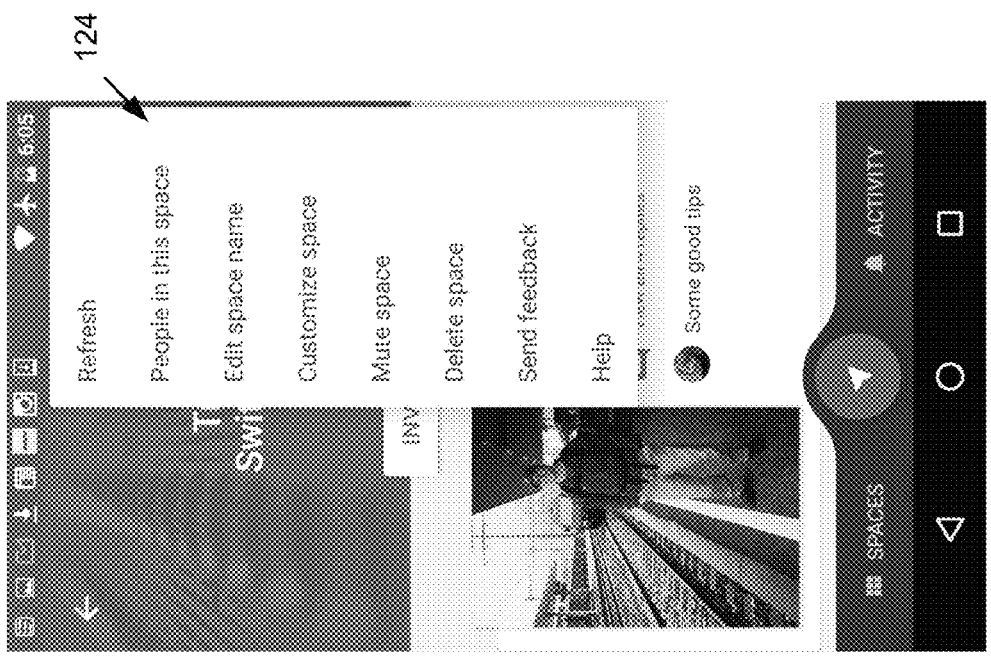

As an example, upon selecting the "Customize space" menu option, the ICSA 508 may generate and display a customization interface, such as the customization interface 128 depicted in FIG. 1E. Using the space customization interface 128, the user may provide input selecting a color theme, one or more background images, and/or other options. Upon configuring the space, the user may select the save option to save the changes, which may then be reflected in other corresponding interfaces, such as interfaces 100 and 114.

Figure 1F:
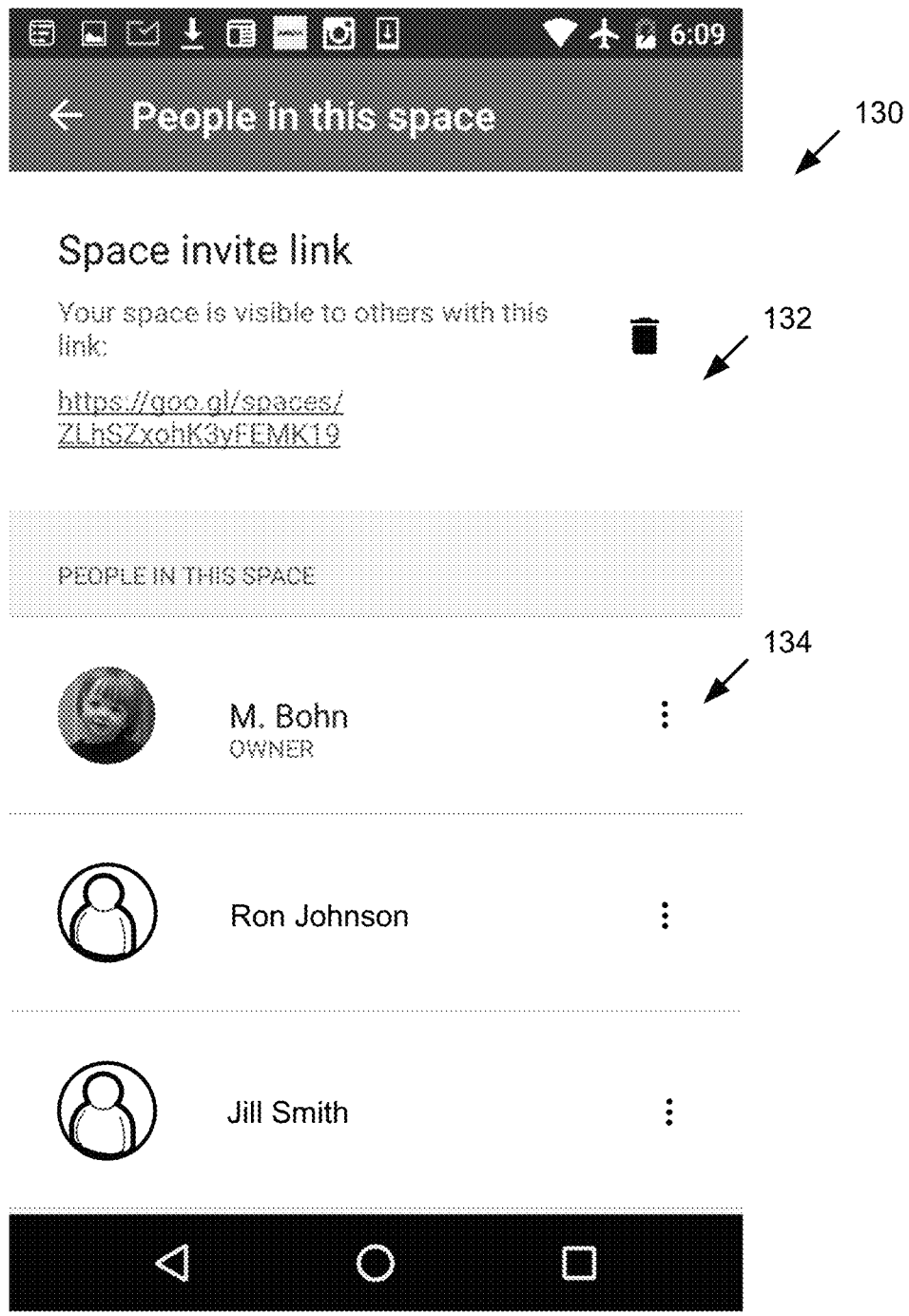
Figure 1G:
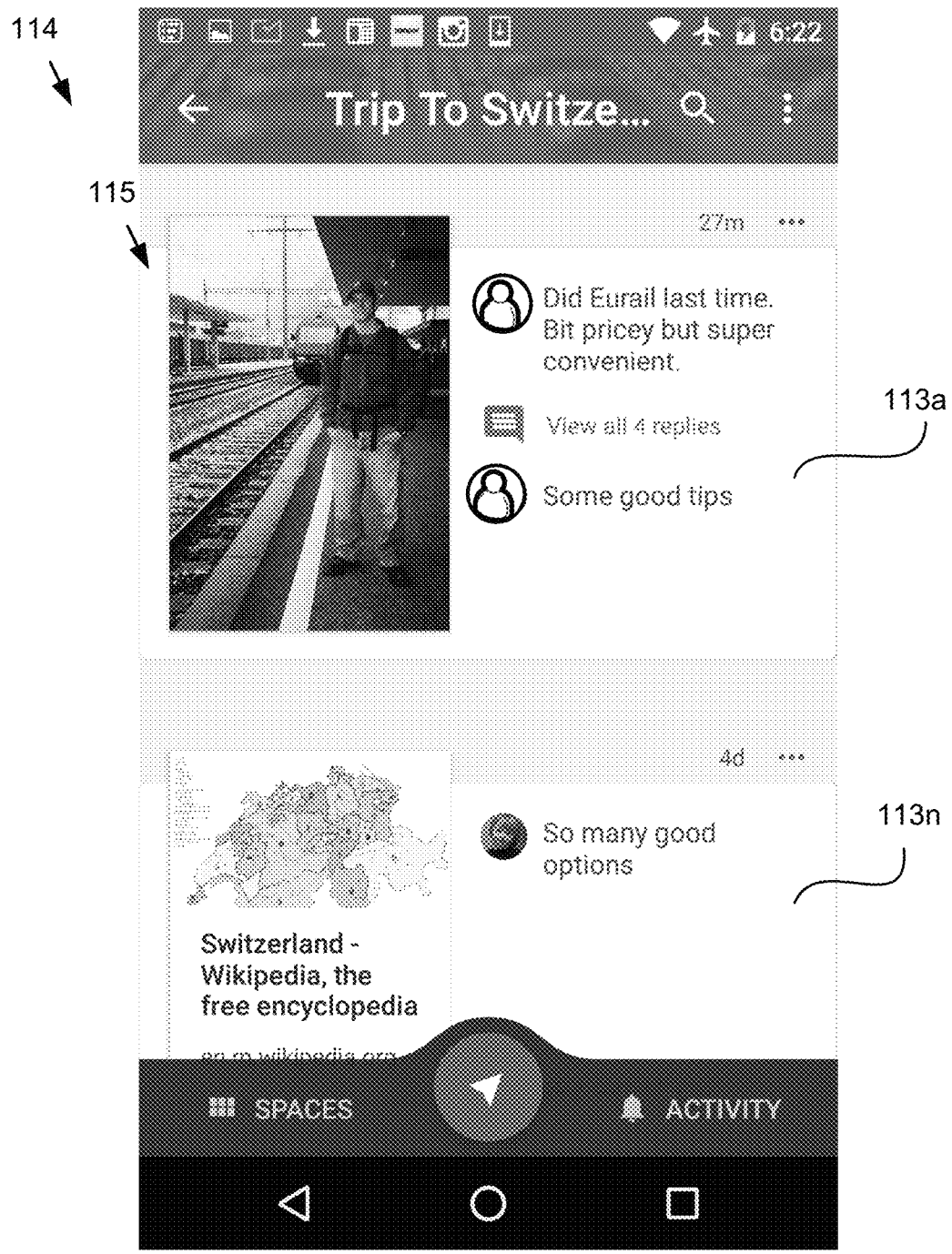

In a further example shown in FIG. 1F, upon selection of the "People in this space" option, the ICSA 508 may generate and display a space member interface 130. The interface 130 may include a pre-generated invitation link 132 uniquely associated with the space that the user may copy and paste into another application and send to other users to invite them to join.

The ICSA 508 may generate the invitation link 132 responsive to the user-selection to access the interface 130, or may generate the invitation link 132 at a prior time, such as when the corresponding space (e.g., Trip to Switzerland) was created by the user. The ICSA 508 may maintain a data store in non-transitory storage indexing the spaces created by the user using a unique space identifier. The ICSA 508 may generate a unique string of characters (e.g., letters, numbers, other characters, etc.) for the invitation link 132 (e.g., using a random serial generator, etc.) and may store the unique invitation link string in the data store and correlate it with the unique space identifier. The unique invitation link string identifying the space may be used by the ICSA 508 as/to form the invitation link 132 when presenting the interface 130.

The other users may select the invitation link 132 using corresponding user interfaces presented on their client devices, and then be redirected to respective instances of the ICSA 508 to view the space and interact with the digital content items contained therein. The interface 130 may further include a list 134 of users already associated with the space. Unique identifiers associated with these users may be stored in association with the space in the data store and queried for retrieval and presentation in the interface 130.

In some implementations, a digital content item, such as a post object, comment object, or other item may embody a purchasable item. The interfaces of the ICSA 508, such as the interfaces 114, 118, 146, etc., discussed herein, may include a user-selectable interface element for initiating a transaction between the client device and a transaction server to purchase the item. In some cases, the user-selectable interface element may be a singly-selectable button, which, with a single selection, may completely transact purchase of the item using a profile associated with the user that includes the requisite information to transact the purchase. This advantageously allows the purchase of the item without requiring further input from the user. In further cases, selection of the purchase button may initiate the rendering of a sequence of interfaces for entering payment and shipping information and confirming the transaction.

By way of example, a space for discussing new consumer electronics may exist within the ICSA 508, and a user associated with the space can submit, via a content posting interface, a post including an electronic link to an electronic e-commerce marketplace page, such as one embodied by the third-party server 516 and the third-party application 518 shown in FIG. 5, offering the newly released gadget for purchase. Another user may receive a notification of the post, or may be navigating the space and come upon the post, and, responsive thereto, may be provided with an interface option purchase the gadget directly from within the ICSA 508. For instance, the activity interface 146 discussed with reference to FIG. 1J may include the above-discussed interface element (e.g., digital button) for transacting the purchase of the gadget with the marketplace. In another example, the space interface 114 may include the interface element for transacting the purchase. Numerous further variations are also possible and contemplated, such as other interface configurations for transacting the purchase, redirecting the user to another application to complete the purchase, etc.

Returning to FIG. 1A, in some implementations, the title of a given space may include digital profile images 107 of the users that have contributed content to the space and/or accessed the space. This is convenient because, at a glance, the viewing user may immediately identify which other users are associated with the space and are contributing content space.

The interface 100 may include a user-selectable interface element 104 for creating a new space. In the depicted implementation, the user-selectable interface element is situated in an empty tile region, although in further implementations the user selectable interface element for creating a space maybe included in a drop-down menu, a menu bar displayed (e.g., persistently) in the interface, or in another suitable content region. The viewing user may select the interface element for creating a space, and responsive to the selection, the ICSA 508 may generate a space creation interface for configuring a new space for posting content. In some implementations, the space creation interface may appear similar to the interface 114 with a blank title and a prompt for the user to seed the space with content (post initial digital content items), although other suitable variations are also possible and contemplated.

Figure 1H:
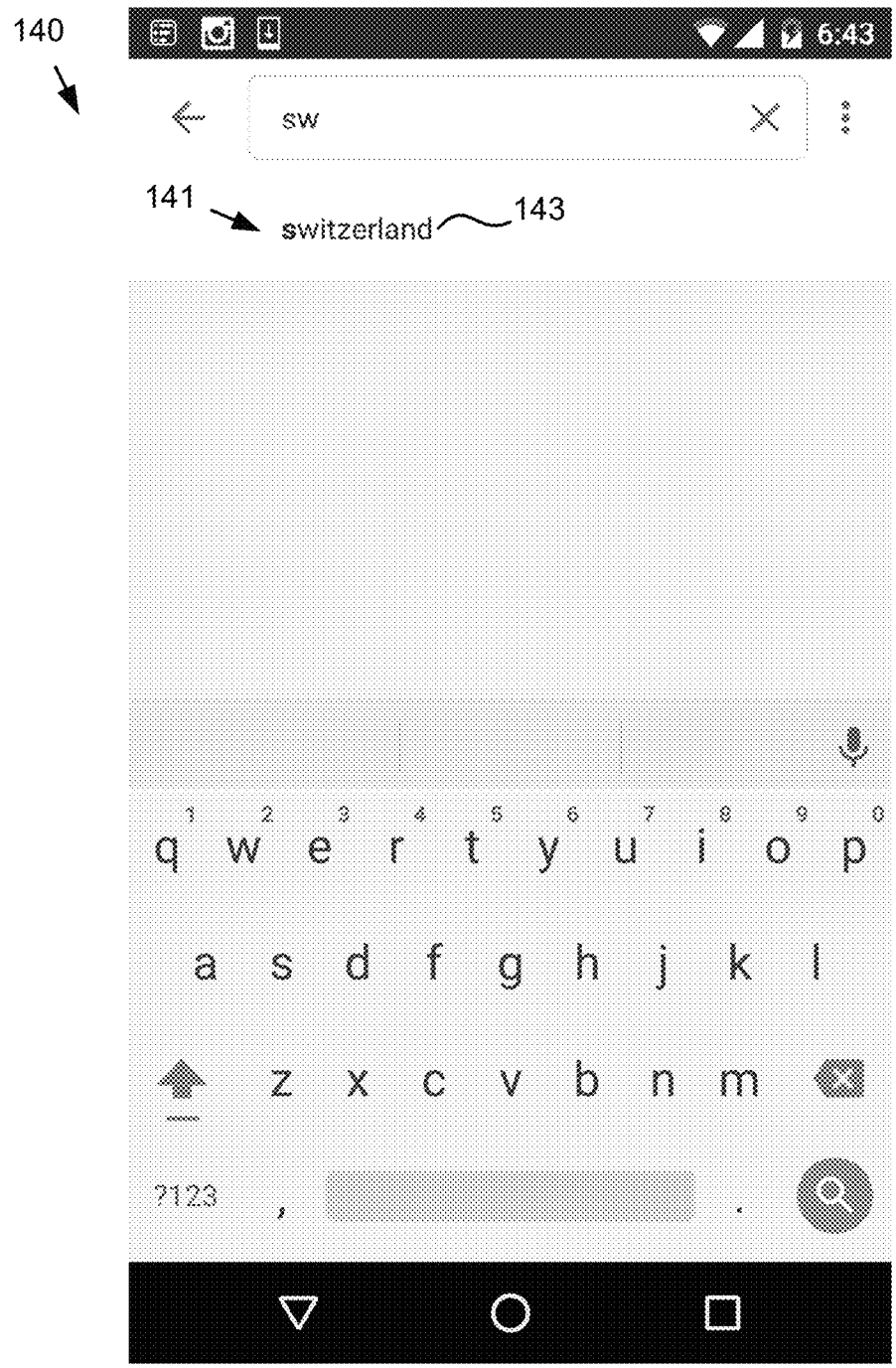

The interface 100 may, in some implementations, include a search region 101 in which the user may input search criteria for searching spaces associated with the user. For example, the search region 101 may include a text box 103 in which the user may input, using an input device of the client device, one or more search terms with which to query the spaces. A further example of a search interface 140 that may be presented upon inputting text in the search region 101 is depicted in FIG. 1H, although it should be understood that search criteria may be input in other forms, such as a voice command captured by a input device of the client device 506 (e.g., a microphone), an image captured by a camera of the client device 506, etc., and the ICSA 508 may generate search criteria using the voice command and/or captured image and execute the query based thereon.

Upon detecting an event indicating that the user input one or more search terms, the ICSA 508 may generate and submit search request to a search engine 526 requesting a set of results matching the search term(s). The search engine 526 may query an index summarizing the content of the spaces using the search term(s) and return a set of matching results.

Advantageously, in some implementations, the ICSA 508 may automatically suggest keywords for the user with which to search, as discussed in further detail below with reference to FIG. 3. The ICSA 508 may present the suggestive keywords in a suggestion region 141 (e.g., a dropdown region, overlay region, pop-up region, etc.) of the interface for selection by the user as shown in FIG. 1H. Upon user selection of a suggested keyword (e.g., 143) using the interface, ICSA 508 may automatically generate and submit a search request to the search engine 526 requesting a matching set of results, and may receive data responsive to submitting the request and display the results in a corresponding interface (e.g., interface 140). The ICSA 508 may hide the suggestion region 141 and/or other graphical input elements (e.g., the soft keyboard, etc.) so as not to further obscure the underlying interface elements (e.g., digital content items matching the search criteria) in some cases.

In some implementations, the scope of a given search may be limited to the digital contents items (e.g., posts, comments, etc.) included in the spaces. In further implementations, upon determining that no results match the search term(s), the ICSA 508 may instruct the search engine to query a wider index, such as one encompassing the Internet or portion thereof, to identify a set of results matching the search term(s), which may be presented in a search interface to the user. Using the search interface 140, the user may select one or more items from the search results (not shown) and add them to an existing space or new space.

Interface 100 may, in some implementations, include a visually persistent menu 108 including a user-selectable content submission element 110, such as the depicted prominent graphical icon, that is selectable by a user to post content to a space. Responsive to the selection of the element 110, the ICSA 508 may generate and display a user interface 142 for locating content to post to the space, such as that depicted in FIG. 1I. The content submission interface 142 may include a search region 143 for searching web-based content, and user-selectable options for searching web-based video files, local video and image files, entering text (e.g., written post), etc.

Upon inputting search term(s) in the search region 143 (e.g., text box 144), the ICSA 508 may generate and display the search results interface showing a set of results 157 matching the search term(s). With reference to search region 143, it should be understood that search criteria may be input in other forms, such as a voice command captured by a input device of the client device 506 (e.g., a microphone), an image captured by a camera of the client device 506, etc., and the ICSA 508 may generate search criteria using the voice command and/or captured image and execute the query based thereon.

An example of a search results interface 156 is depicted in FIG. 1K, and FIGS. 1L, 1M, 1N, and 1O depict an example progression of adding a particular result 159 from the set of search results 157 (which the user found and selected while scrolling through the results 157 presented in interface 156) to an existing space titled "Trip to Switzerland" (by selecting an interface icon representing that space in FIG. 1M). For instance, upon determining to add a digital content item (e.g., a particular result 159, the set of search results 157, another suitable object, etc.) to a space, the user may select the post addition interface element 161, and responsive thereto, the ICSA 508 may generate and display the space selection interface region 163, from which the user may select an existing space or select to create a new space using the corresponding space selection elements 164. The region 163 may be displayed as an overlay overlaying the content in the interface in which the post addition interface element 161 was selected, as a separate interface, or in another suitable form.

Figure 1J:
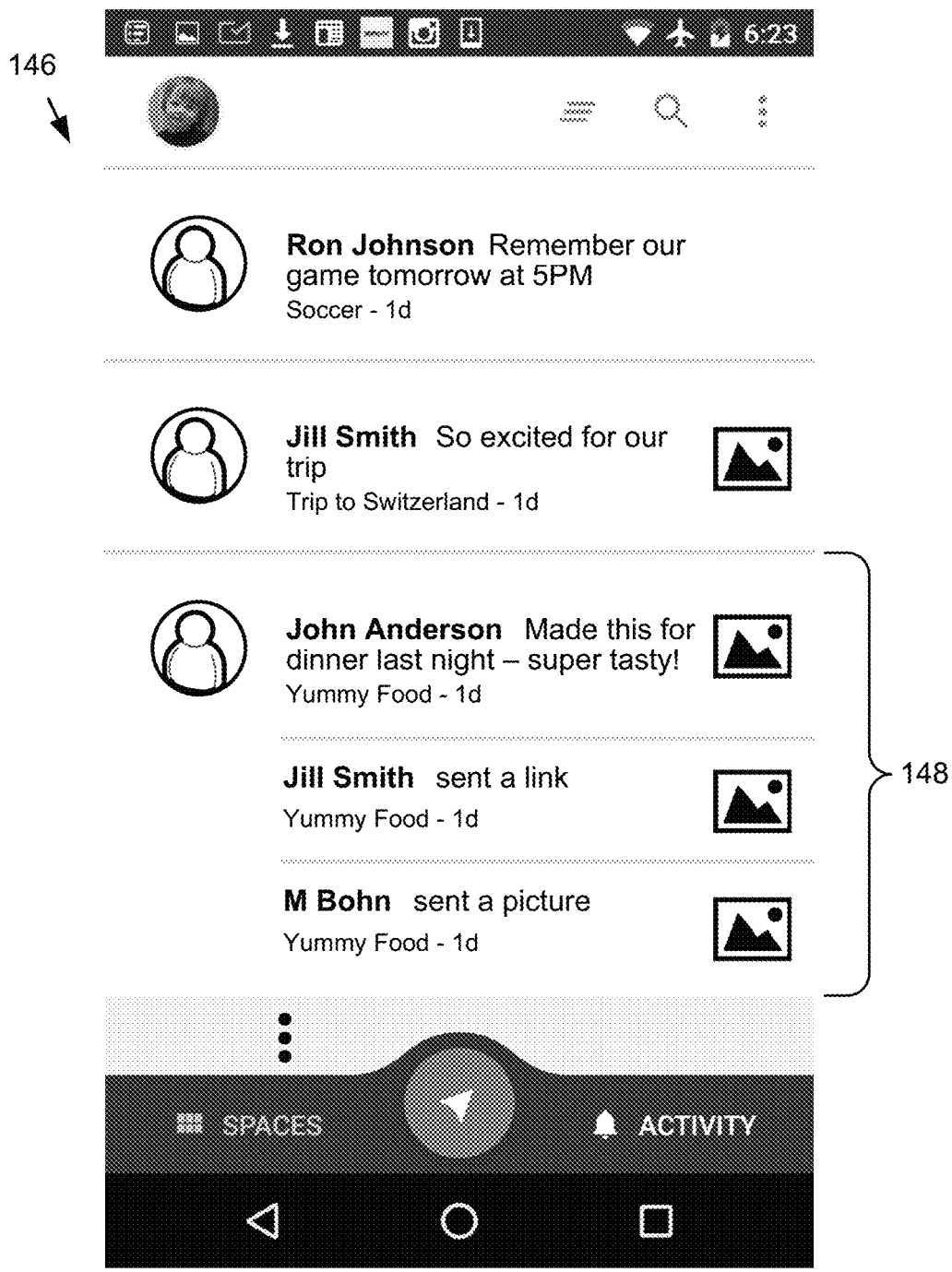
Figures 1N, 1O:
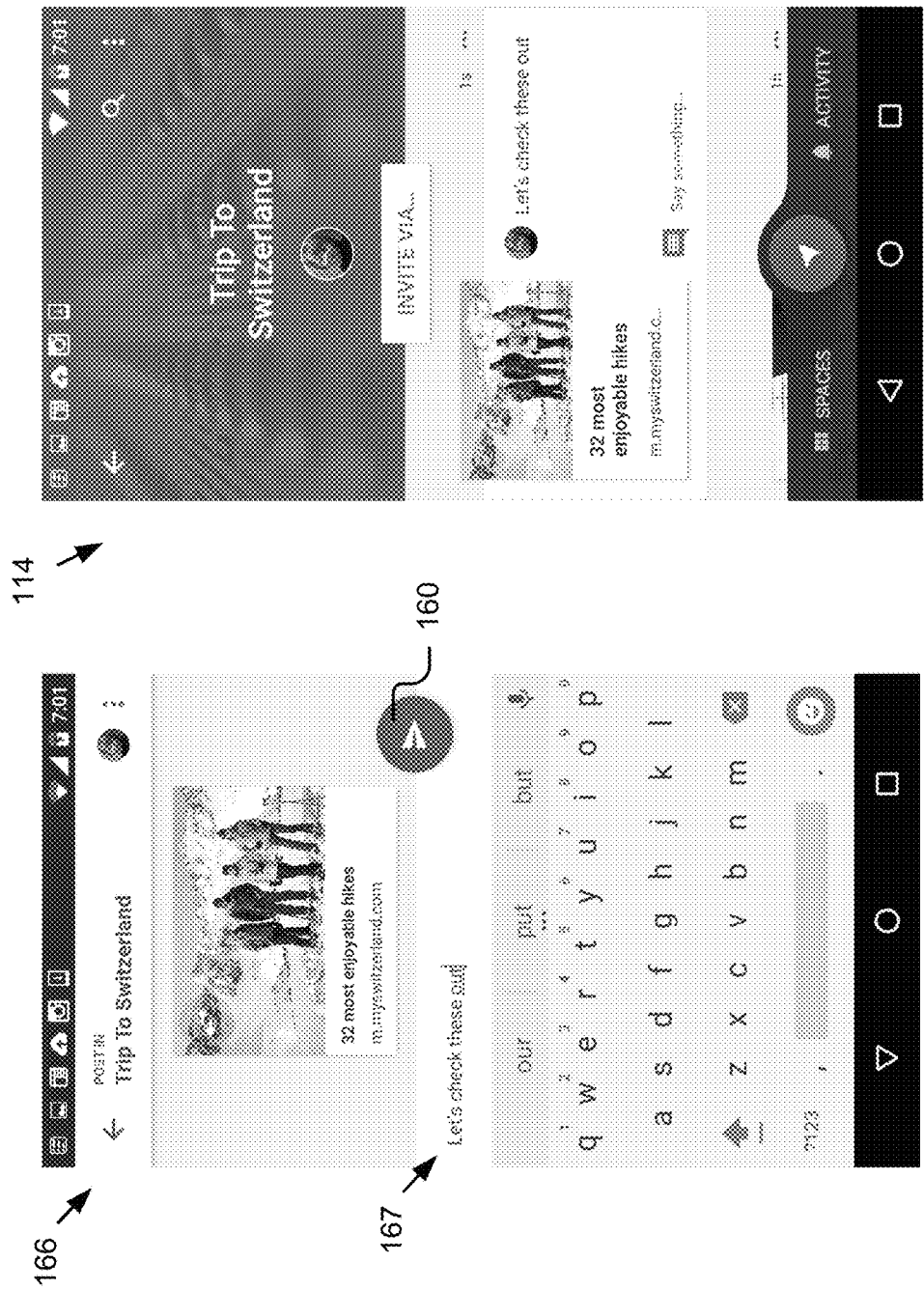

Prior to, or responsive to the selection of the target space for the post, the user submitting digital content item(s) to the space may include a comment describing the item(s). For example, as shown in FIG. 1N, the ICSA 508 may display a comment interface 166 including a preview of the item(s)

to be posted and a comment region 167 including interface elements for authoring the comment (text box, soft keyboard, formatting elements, emoji selection elements, etc.). For instance, as shown in FIG. 1N, prior to submitting the post, the user entered an initial comment about the website discussing the 32 most enjoyable hikes in Switzerland as recommended by a given webpage. Upon selecting to submit the post (e.g., with the comment) (e.g., by selecting interface element 160), the ICSA 508 may receive post data embodying the post and the comment, generate a new entry in a corresponding posts data store to store the post data, and update the space interface 114 to include a summary of the post. For instance, the ICSA 508 may, in some implementations, generate a unique identifier for the post and store the identifier and the corresponding data embodying the post in the data store in association with the space object and an account of the user.

While the implementations described with reference to FIGS. 1K-1N relate to the addition of search result-related item(s) to a particular space, it should be understood that other posting methods are also possible contemplated. For example, as shown in FIG. 1I, a user may select other content options, such as an option to post a file (e.g., from local storage, cloud storage, etc.) (e.g., spreadsheet, word processing document, design file, etc.) by selecting the file attachment interface element 145a; an option to post a video (e.g., from local storage, a video streaming website, cloud storage, realtime via a video capture interface, etc.) by selecting the video attachment interface element 145b; an option to post a photo (e.g., from local storage, a photography website, cloud storage, realtime via a photo capture interface, etc.) by selecting the photo attachment interface element 145c; or an option to post text by selecting the text interface element 145d, etc. Responsive to selecting one of the elements 145a, 145b, 145c, or 145d, the ICSA 508 may present and/or redirect the user to appropriate interfaces for selecting the digital content items, and once selected, present interfaces the same as or similar to those depicted in FIGS. 1J-1N to facilitate the addition of the selected item(s) to the target space.

Referring again to FIG. 1A, in some implementations, the interface 100 may include a user-selectable interface element 106 for accessing recent activity by users with the one or more of the user's spaces (to which the user has access or of which the user is a creator). Responsive to the selection of the activity element 106, the ICSA 508 may generate and display an activity interface 146 as shown in FIG. 1J. The activity interface 146 may aggregate activity that occurred in each of the spaces. In some implementations, a user may have a multiplicity of active space objects to which other authorized users may be submitting posts and the activity interface 146 may display a summary of such. For example, the activity interface 146 may display a summary of the digital content items, such as the various posts and comments, posted by users in the spaces.

Advantageously, in some implementations, the ICSA 508 may coalesce various items in the list 149 of items 147 (e.g., 147a, 147b, . . . 147n) shown in the activity interface 146 to allow the viewing user to quickly digest the activity information. For example, various content items (e.g., comments 147b, 147c, . . . 147n about a post) may be coalesced and displayed in a group in the interface 146. The ICSA 508 may coalesce these content items based one or more attributes of the items satisfying one or more coalescing criteria, which may be predetermined. Coalescing criteria may include, but are not limited to, a timeframe, a space object attribute, a post object attribute, user attribute(s), etc. For example, the ICSA 508 may coalesce content items based on the time stamps of the content items occurring within a certain threshold (e.g., the past 24 hours) and the content items associated with a particular space object (e.g., the "Yummy Food" space) in a group 148. The ICSA 508 may determine to coalesce content items into a group based on the attributes of those items being the same and/or similar. The ICSA 508 may, in some cases, determine a group of content items to be sufficiently similar based on a value of the attribute meeting a certain threshold or falling within a pre-determined range (e.g., time stamps of the items are within 1 day, 2 days, 3 days, etc., of one another).

Advantageously, in some implementations, the ICSA 508 may delay notifying user for a certain amount of time to allow digital content items (e.g., comment objects, post objects, etc.) to coalesce. This may include both notifications provided in-application as well as notifications transmitted to a client device of a user using one or more other communication mediums, such as push notifications displayed by an operating system of a client device 506 associated with the user, email notifications transmitted to an electronic address of the user, etc. This is advantageous as it can reduce the number of times a user is notified with updates and avoid notification exhaustion—a situation where the user is repeatedly inundated with notifications and opts to turn them off entirely. Furthermore, coalescing in the above sense has the technical effect that the number of transmissions of notifications from a server to a client device is reduced, thus reducing the overhead of connection establishment and message creation per notification, thus improving transmission efficiency.

In some implementations, items 147 in the activity interface 146 may be sorted by recency (e.g., with the newest items at the top and the oldest at the bottom), although other variations are also possible and contemplated. For instance, in some instances, the ICSA 508 may rank items 147 in a coalesced group of items based on an average age or the age of a first item in the group, relative to other items in the list, and the ICSA 508 may accordingly sort the items 147 in order of rank (e.g., bottom to top, top to bottom, etc.).

Figures 1P, 1Q, 1R:
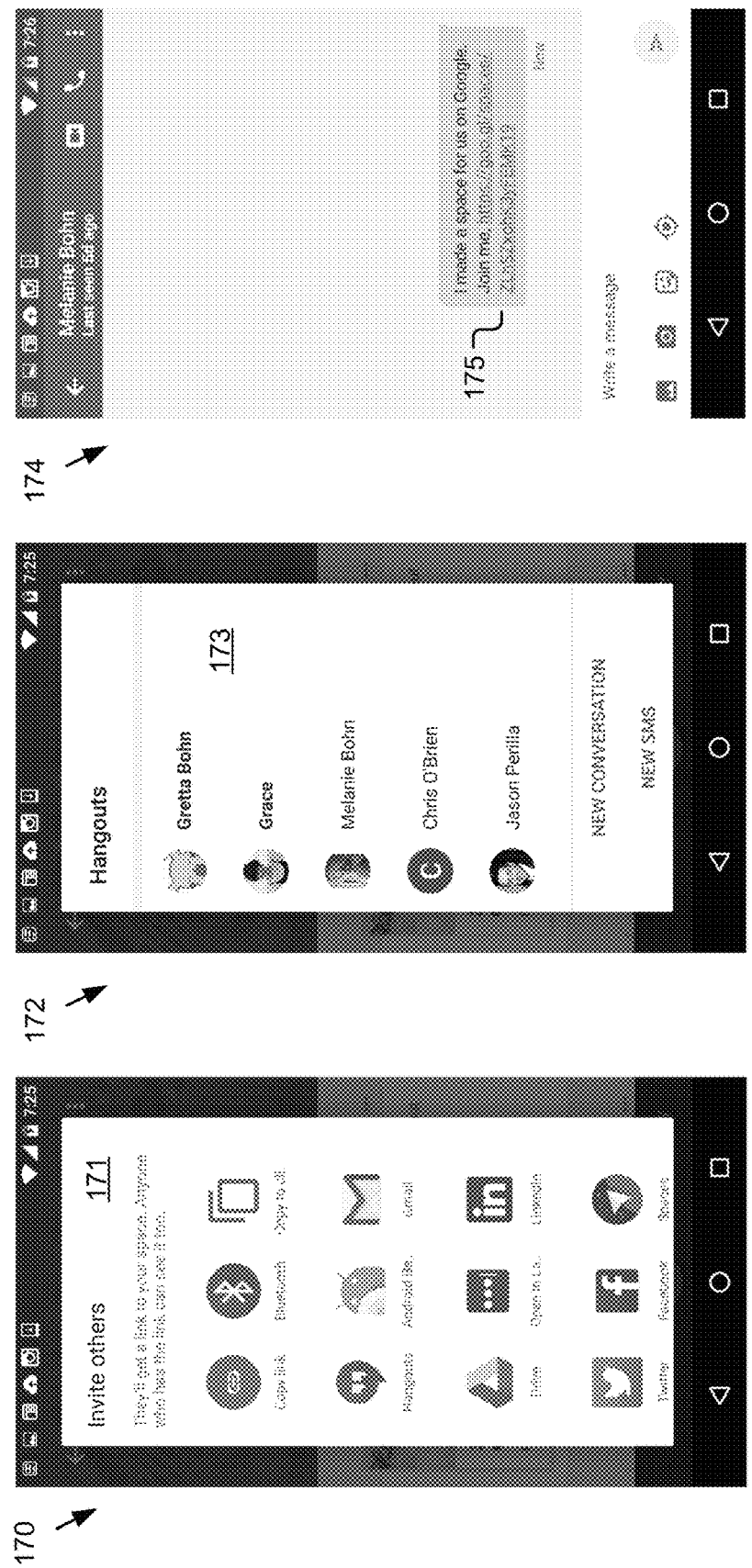

Referring again to FIG. 1B, in some implementations, the space interface 114 may include a user-selectable interface element, such as the button 117, to invite users to contribute to a space. This element 114 may displayed upon creation of a new space or accessing of an existing space. Upon selection of the element 114, the ICSA 508 may generate and display a communication medium selection interface 170 as shown in FIG. 1P. Using the communication medium selection interface 170, which may include a list of communication mediums 171 (e.g., icons for the mediums, textual descriptions of the mediums, etc.), the user may select which medium to use to invite users to contribute to the corresponding space. For example, in FIG. 1P, the user may select an instant messaging medium, and responsive to the selection, the ICSA 508 may retrieve from a server associated with that medium, such as a third-party server 516 hosting a third-party application 518 that embodies the medium, a list of contacts with which the user is associated (e.g., with which the user has exchanged electronic messages in the past). In some example, ICSA 508 would have authenticated with the third-party server 516 and been authorized by the user to access such data.

In some implementations, the ICSA 508 may store authorization data granting permission to a set of users to access a space object (e.g., newly created space object, existing space object, destination space object to received forked item(s), etc.) and/or to post digital content items to the space object. For instance, in an example in which a user is forking digital content item(s) from a source space to a destination space, the ICSA 508 may automatically set visibility and posting permissions for the destination space based on the permissions of the source space (e.g., authorizes the set of users, who already having permission to post digital content items to the source space, to access the destination space). In further instances, the ICSA 508 may require the user forking content to indicate which other users can access and/or post objects to the destination space, and/or allow for the other users to opt-in. Other variations are also possible and contemplated.

FIG. 1Q includes an example interface 171 for selecting one or more users from a contact list 173 associated with a particular communication medium. Upon receiving a selection of profiles of users from the list, the ICSA 508 opens an application associated with the communication medium, instructs the generation of an electronic notification addressed to the selected users and including an electronic link to the space to which the users are being invited to contribute content, and instructs the transmission of the electronic notification 175 to the electronic addresses of those users as shown in the medium messaging interface 174 depicted in FIG. 1R.

FIGS. 1S-1X are graphical representations of an example split screen 166 interface for viewing a post object and corresponding comments associated with the post object. In some implementations, the user may access the split screen interface depicted in these figures from a corresponding space interface 114 (similar to that depicted in FIG. 1B) or a detailed post interface 118 (similar to that depicted in FIG. 1C). For example, in FIG. 1C, the user may select a graphical representation of a post object, such as the image 119, and the ICSA 508 may generate and display the interface 166 depicted in FIG. 1S. Interface 166 may include a post content region 178 that maximizes a viewing area for viewing the post object 179, which in this case is a webpage describing top destinations in Switzerland. The interface 166 includes a user-selectable conversation element 177 at the first end of the interface 166. Responsive to the selection of the conversation element 177, ICSA 508 automatically splits the screen to show the conversation thread 182 in one content region 181 and the post object 179 in an adjacent content region 178. The two content regions 178 and 181 formed by the divider 180 may be dynamically resized by the user by moving the divider 180 toward one or another end (e.g., top or bottom in this example) of the interface.

For example, in a portrait orientation, the divider 180 may extend laterally from one side of the interface 176 to another, splitting the screen into a top content region 178 and a bottom content region 181. In this example, the post object 179 depicted in the top region 178 may be contracted by moving the divider 180 upward (e.g., dragging the divider with a pointing device, upward sliding gesture, etc.) as shown in the progression depicted by FIGS. 1T-1V. As the divider 180 reaches the top of the interface 176 as shown in FIG. 1W, the top content region 178 depicting the post object 179 may be hidden and the divider 180 may be visually connected to a top portion of the interface to form a menu bar. The user may re-divide the screen by again moving the divider 180, which embodies a menu bar in this example, downward using a corresponding input gesture (e.g., responsive to an input gesture, such as a swipe down), the divider 180 (e.g., menu bar) may be disconnected from the top of the interface, and the top content region 178 may again be displayed as separate from the bottom region 181. FIG. 1X depicts an implementation where an address bar reflecting a unique electronic address of the post object 179 may be displayed in association with the split interface 176'.

As the bottom region expands, as shown in FIGS. 1V and 1W, for instance, additional comments 182 included in the comment thread may be displayed (as applicable), and conversely, the eldest comments may incrementally be hidden as the bottom region is contracted by the divider being moved downward toward the bottom of the screen, as shown in FIG. 1U. In a landscape orientation, a similar experience may be provided, with the interface content being rotated 180°.

Figures 2A, 2B:
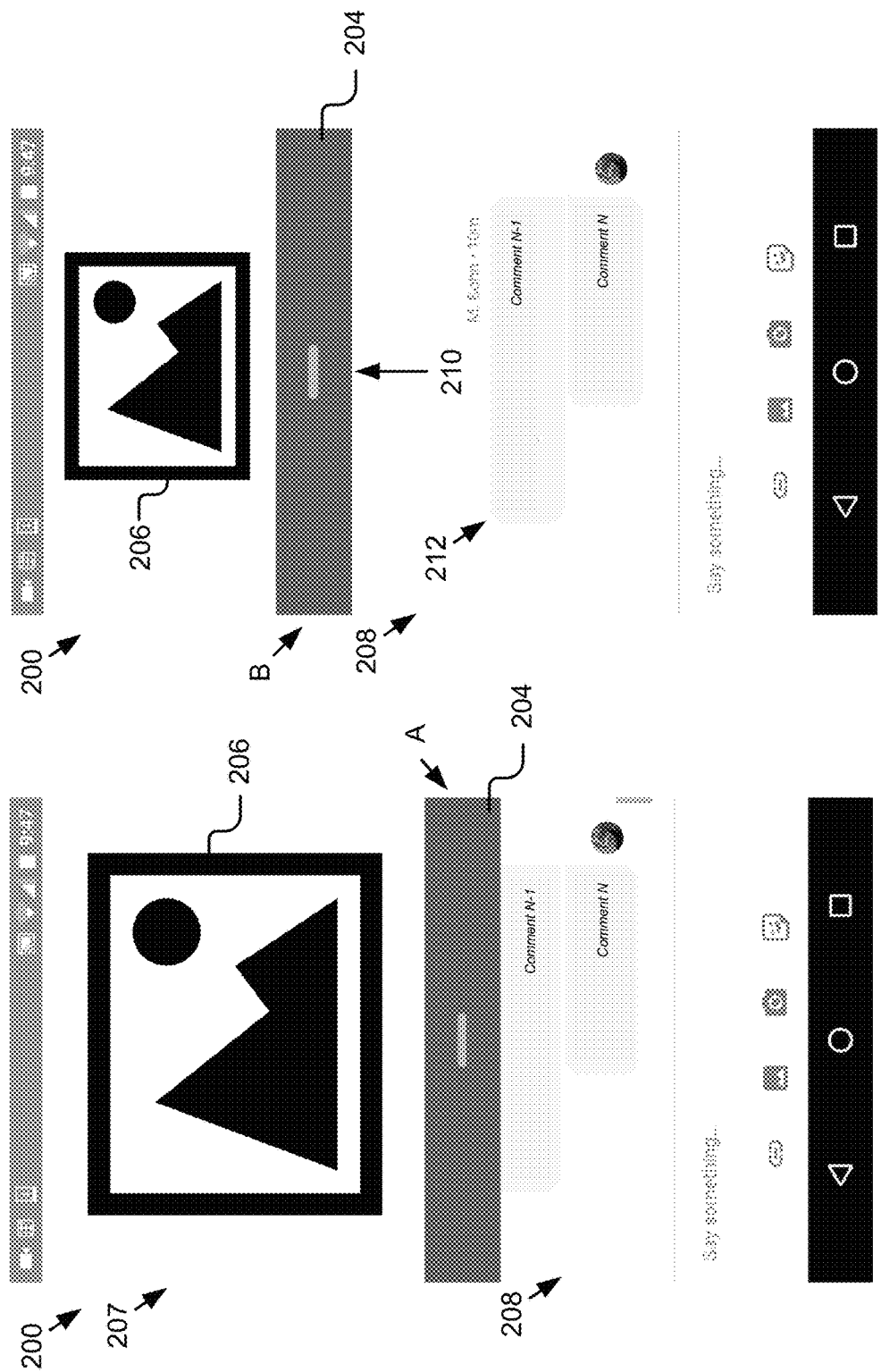
FIGS. 2A and 2B are graphical representations of an example graphical user interface for scaling content in a first content region based on the scaling of an adjacent second content region.

As shown in FIGS. 2A and 2B, in some implementations, the content in one or both of the divided regions may be scaled instead of scrolled as the regions may be expanded and contracted with the movement of the divider 204. For example, based on input received from an input device of the client device of the user (reflected by arrow 210), the divider 204 dividing interface 200 may be moved from position A to position B, thus contracting the top content region 207 and expanding the bottom content region 208. In this example, the post object 206, which in this case includes an image or a video file, may be scaled downward in size so that it is still fully visible within the content region. In the bottom region 208 (which in this case is a comment thread region), additional comments 212 in the comment thread region may be displayed, currently displayed comments 212 may be unobscured, and/or the comments 212 may be scaled in size to appear bigger.

Figure 3:
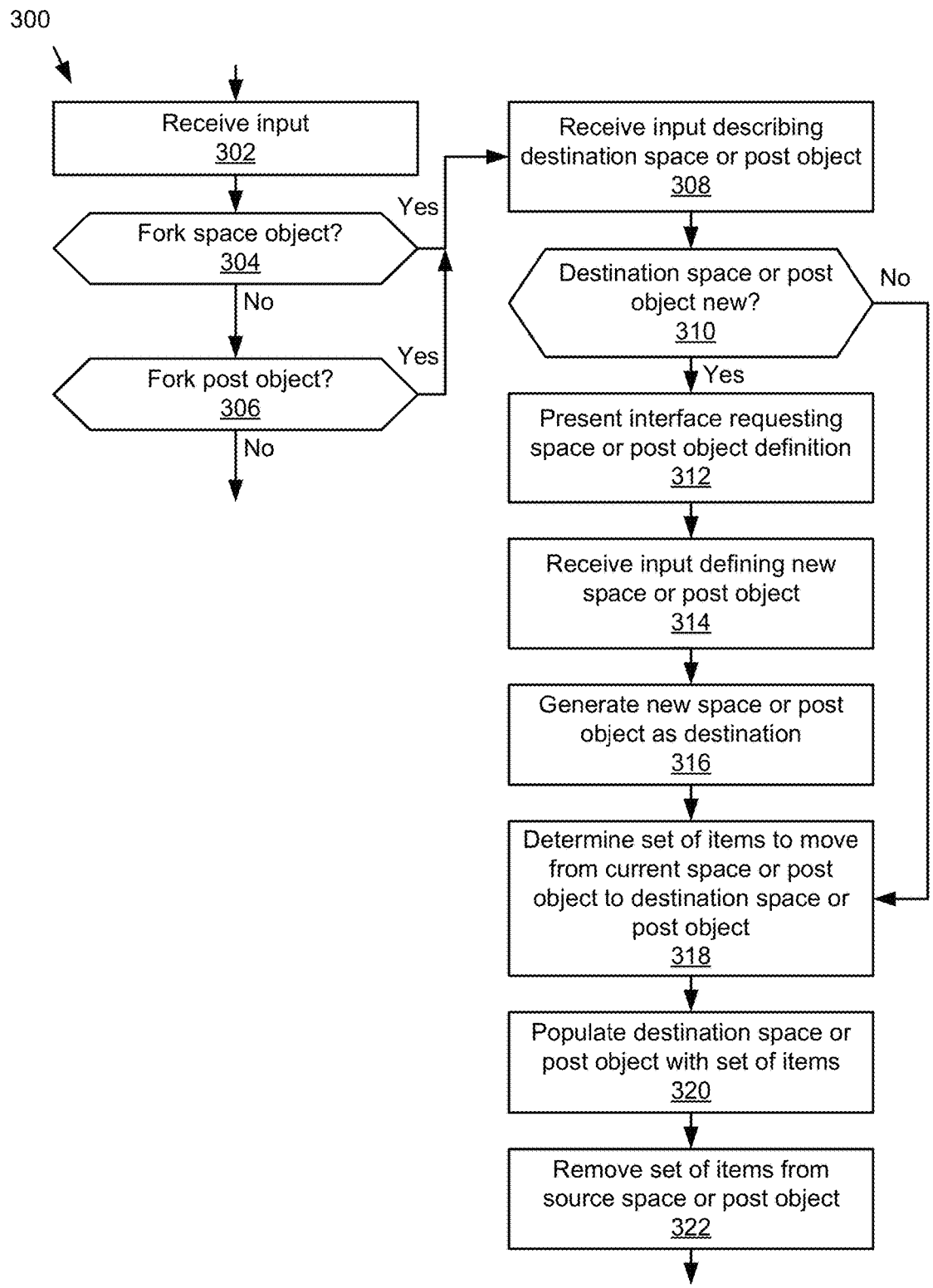
FIG. 3 is a flowchart of an example method for forking digital content from a space or post object to another space or post object.

FIG. 3 is a flowchart of an example method 300 for forking digital content from a space or post object to another space or post object. In block 302, the ICSA 508 may receive an input. In some implementations, the input may be received via the interface associated with the ICSA 508. For example, a user viewing a space via a corresponding space interface or comment thread via a post interface may select to fork a portion of the content (e.g., by selecting a fork button or other graphical user interface element).

Responsive to receiving the input 302, the ICSA 508 may determine in block 304 whether to fork space object. For instance, the input received in block 302 may instruct the ICSA 508 to fork one or more posts of a given source space, and the method 300 may proceed to block 308. The source space may embody a first virtual content sharing environment. The first virtual content sharing environment may be associated with a topic.

If the determination in block 304 is negative, the ICSA 508 and proceed to block 306 and determine whether to fork a post object. For instance, the input received in block 302 may instruct the ICSA 508 to fork one or more comments made in association with a given post to one or more other posts. If the determination in block 306 is affirmative, the ICSA 508 may proceed to block 308. However, if the determination in block 306 is negative, the ICSA 508 may proceed to perform other operations, terminate, or wait until a subsequent input is received and return to block 302 and repeat the method 300.

In block 308, and ICSA 508 may receive input describing a destination space or post object in which to fork content. A destination space may embody a virtual content sharing environment separate from the source space. For instance, the destination space may be associated with topic other than the topic of the source space. As a further example, in some implementations, the ICSA 508 may render, for presentation on a plurality of displays, digital content item interaction (DCII) interfaces, as discussed elsewhere herein. The DCII interfaces may comprise a first space object in which digital content items are postable by users. The first space object may reflect the source space and the ICSA 508 may receive, via user interaction with the DCII interfaces, one or more digital content items associated with the first space object that describe a topic different from the topic of the first space object.

In block 310, the ICSA 508 may determine whether the destination space or post is new and should be created. If the determination in block 310 is affirmative, the ICSA 508 may generate and present an interface requesting a space or post object definition to which content from the source space or post object should be forked. In block 314, the ICSA 508 may receive input, via the interface presented in block 312, defining the new space or post object, and in block 316 ICSA 508 may generate the new space or post object as the destination object.

As a further example, in some implementations, in association with block 314, the ICSA 508 may render for display a space creation interface, such as the interfaces described with reference to FIGS. 1A, 1M, etc., providing user interface elements to create the destination space including an interface element for inputting the second topic and for pre-populating the destination space with digital content items. Via interaction by the user with the space creation interface using the input device, the ICSA 508 may receive input defining the second topic for the destination space, and then generate a destination space object embodying the destination space using the input defining the second topic for the destination space and store the destination space object in the data store.

In some further implementations, as described with reference to FIGS. 1A, 1M, etc., the ICSA 508, in association with receiving input describing the destination space, may render for display a space selection interface providing user interface elements to select the destination space from among one or more pre-existing spaces and for pre-populating the destination space with digital content items. Responsive to displaying the space selection interface, the ICSA 508 may receive input identifying a space object identifier associated with an existing space and the ICSA 508 may use the space object identifier when forking the content from the source space to the selected destination space associated with the space object identifier.

In block 318, ICSA 508 may determine a set of items to move from the current source space or post object to the destination space or post object. In some implementations, data identifying the set of items that are to be forked may have been provided in the inputs received in blocks 302, 308, or 314. Alternatively, and/or in association with blocks 302, 308, or 314, the ICSA 508 may generate and present an interface including the data comprising the source object and user selectable interface elements for identifying which specific items should be moved to the destination object.

For instance, the ICSA 508 may render a content item selection interface presenting digital content items included in the source space and including user-selectable interface elements for identifying which specific digital content items to move. Responsive to presenting the content item selection interface, the ICSA 508 may receive, from the user via the input device of the client device, an input selecting the set of digital content items to move from among the digital content items presented in the content item selection interface, and the ICSA 508 may receive the input reflecting the selection and determine the set as the set of digital content items to move based on the selection.

In some implementations, the set of digital content items to move may include a post object and one or more comments submitted responsive to posting of the post object. For instance, the topic of the destination space may be related to topic of the one or more digital content items, where the topic of the source space may be unrelated. Under the method 300, the post object and the one or more comments (which are unrelated to the first topic) may be moved to a space with a related topic.

As a further example, a message thread may include 10 comments, and the most recent five comments may apply to a different topic than the topic discussed by the corresponding posts. The user may select the five most read recent comments as the items that should be forked to a different post, whether it be a new post or another existing post. A similar example applies to a space which may include five posts, two of which may relate to a different topic than that covered by the space, and the viewing user may have provided input instructing the ICSA 508 to create a new space object to which the two unrelated posts may be moved. Other variations are possible and contemplated. Forking in the above sense has the technical effect that the number of objects and/or posting in a source space is reduced, so that, for example, storage and indexing operations performed on the source space can occur more efficiently.

In block 320, the ICSA 508 may populate the destination space or post object with the set of items determined in block 318, and in block 322 the ICSA 508 may remove the set of items from the source space or post object. In some implementations, populating the destination space includes associating the digital content items being moved with the destination space object in the data store, and unassociating the digital content items being moved from the source space. In some cases, fork data reflecting the moving of the items may be stored in the data store so if the user that moved the items later decides to undo the movement of the items between spaces, the user may provide input via a corresponding user interface presented by the ICSA 508, instructing the ICSA 508 to undo the move/fork. Responsive to receiving the input, the ICSA 508 may process it to determine whether proceed to undo the move/fork, and if so, complete the procedure. Any further digital content items submitted after the move/fork (e.g., by the user or other members of the destination space) in association with the moved digital content items may also be included in the move back to the originating source space or may be selected for deletion and deleted. To undo the move/fork, the ICSA 508 may unassociate the items from the destination space and reassociate the items with the source space.

After the ICSA 508 has completed the operations of block 322, the ICSA 508 may return to block 302 and await subsequent input, may terminate, or proceed to perform other operations. It should be understood the method 400 and/or portions thereof may be repeated for further forking procedures and/or for undoing a previously executed fork procedure.

Figure 4:
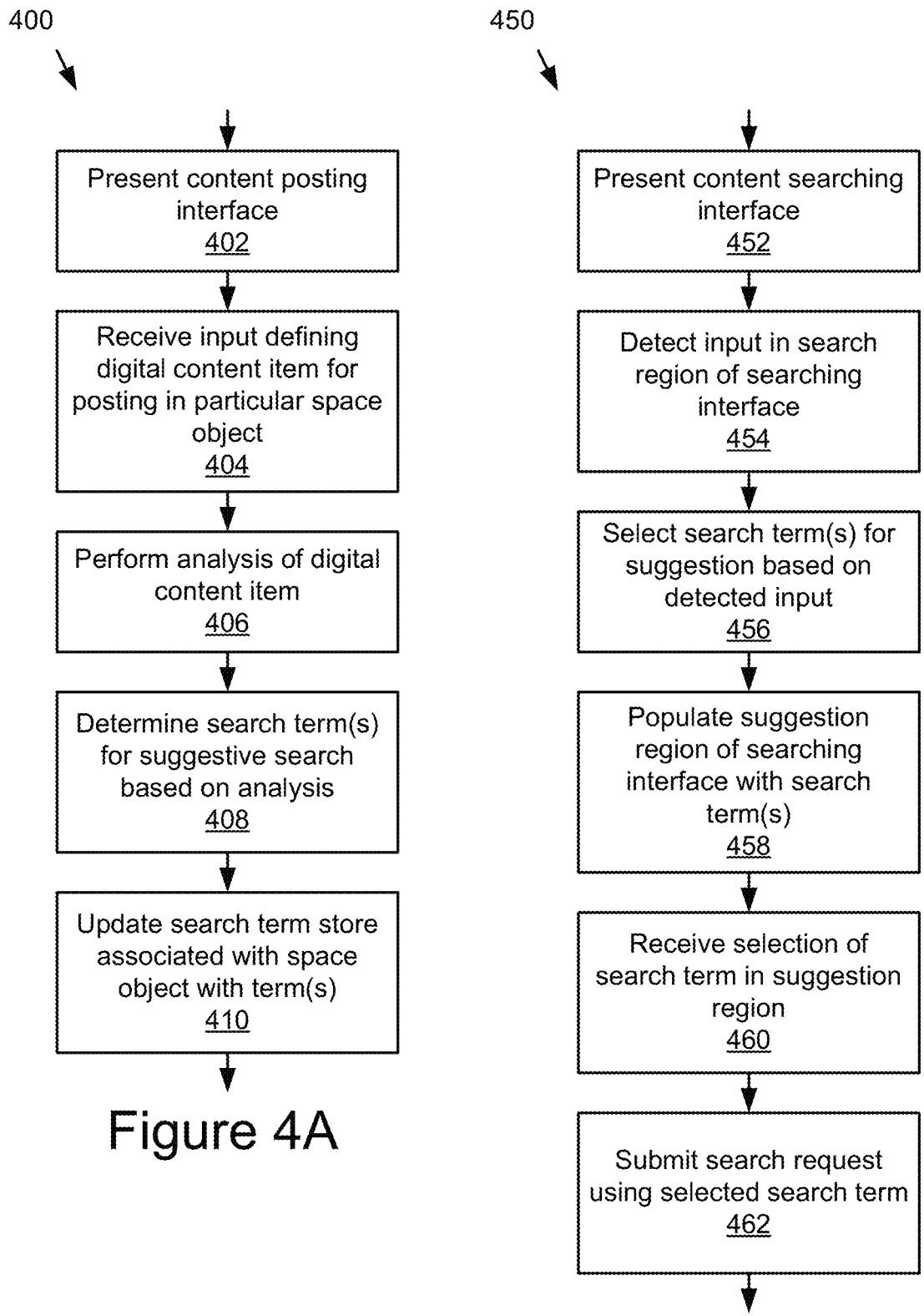
FIG. 4A is a flowchart of an example method for indexing content items.
FIG. 4B is a flowchart of an example method for searching space objects using suggested search term(s).

FIG. 4A is a flowchart of an example method 400 for indexing content items. In block 402, the ICSA 508 presents a content posting interface including interface elements for inputting digital content items for a space. For example, the ICSA 508 may present the interface 142 depicted in FIG. 1I or the interfaces 166 depicted in FIGS. 1V-1X for inputting comments. In block 404, ICSA 508 may receive input defining a digital content item for posting in a particular space object, and in block 406, may perform an analysis of the digital content item.

By way of example, the ICSA 508 may receive image data comprising image(s) captured by the user using an imaging sensor of a mobile device, such as a phone camera, and may perform object recognition on the image data using standard object detection techniques to determine objects depicted by the image(s). Additionally or alternatively, the ICSA 508 may process metadata included in the image data to determine any tags used to tag content included in the image, such as names, places, locations, etc. In these embodiments, the owner of the content has opted-in and provided express consent to process data from the images.

In block 408, the ICSA 508 determines search term(s) for suggestive search based on the analysis performed in block 406. For example, the ICSA 508 may use, as search terms, any keywords or phrases processed from image data, video data, textual data, and/or other data embodying the digital content item(s) received in block 404 and analyzed in block 406.

In block 410, the ICSA 508 updates the search term store associated with the space to which the digital content item was posted with the terms determined in block 408.

FIG. 4B is a flowchart of an example method 500 for searching space objects using suggested search term(s). In block 452, the ICSA 508 generates and presents a content searching interface, such as but not limited to the interface 140 depicted in FIG. 1H. In block 454, the ICSA 508 detects an input and a search region of the searching interface, and in block 456, selects search term(s) for suggestion based on the input detected in block 454. The ICSA 508 then populates, in block 458, a suggestion region of the searching interface with the selected search term(s). For example, a user searching for "Switzerland" may enter an "s" in a text field of the search region of the interface, and the ICSA 508 may query the term store associated with the spaces of the user for search term(s) matching that initial input (the "s"), and populate a drop-down located proximate to the text field with the matching term(s).

In block 460, the ICSA 508 receives a selection via an input device of the client device of the user selecting a search term in the suggestion region, and in block 462, the ICSA 508 submits a search request to the search engine using the selected search term, and in response, receives a set of search results with which to populate the searching interface. The user may then select items from the search results with which to populate a space.

FIG. 5 is a block diagram of an example system 500 for interactive sharing of digital content. The illustrated system 500 includes client devices 506*a* . . . 506*n*, a third-party server 516, a server 522, and a notification server 530, which are communicatively coupled via a network 502 for interaction with one another. For example, the client devices 506*a* . . . 506*n* may be respectively coupled to the network 502 via signal lines 504*a* . . . 504*n* and may be accessed by users 512*a* . . . 512*n* (also referred to individually and collectively as 512) as illustrated by lines 510*a* . . . 510*n*. The third-party server 516 may be coupled to the network 502 via signal line 514. The server 522 may be coupled to the network 502 via signal line 520. The notification server 530 may be coupled to the network 502 via signal line 528. The use of the nomenclature "a" and "n" in the reference numbers indicates that any number of those elements having that nomenclature may be included in the system 500.

The network 502 may include any number of networks and/or network types. For example, the network 502 may include, but is not limited to, one or more local area networks (LANs), wide area networks (WANs) (e.g., the Internet), virtual private networks (VPNs), mobile (cellular) networks (e.g., the mobile network 503), wireless wide area network (WWANs), WiMAX® networks, Bluetooth® communication networks, peer-to-peer networks, other interconnected data paths across which multiple devices may communicate, various combinations thereof, etc. Data transmitted by the network 502 may include packetized data (e.g., Internet Protocol (IP) data packets) that is routed to designated computing devices coupled to the network 502. In some implementations, the network 502 may include a combination of wired and wireless networking software and/or hardware that interconnects the computing devices of the system 500. For example, the network 502 may include packet-switching devices that route the data packets to the various computing devices based on information included in a header of the data packets.

The mobile network 503 may include a cellular network having distributed radio networks and a hub. In some instances, the radio networks may include groups of transceiver nodes (i.e., cell sites), which are distributed over a geographic area. Each group of transceiver nodes may be controlled by a controller device (either within the radio network or hub of the mobile phone network). In some implementations, one or more client devices 506*a* . . . 506*n* may connect to the network 502 via a wireless wide area network (WWAN) of the mobile network 503. For instance, the mobile network 503 may route the network data packets sent and received by the client device 506*a* to the other entities 506*n*, 516, 522, and/or 530 that are connected to the network 502 (e.g., via a the Internet, a VPN, etc.).

The mobile network 503 and client devices 506 may use a multiplexing protocol or a combination of multiplexing protocols to communicate including, for example, FDMA, CDMA, SDMA, WDMA, or any derivative protocols, etc. The mobile network 503 and client devices 506 may also employ multiple-input and output (MIMO) channels to increase the data throughput over the signal lines coupling the mobile network 503 and client devices 506. The mobile network 503 may be any generation mobile phone network. In some instances, the mobile network 502 maybe a 2G or 2.5G GSM, IS-95, etc., network; a 3G UTMS, IS-2000, etc., network; a 4G HSPA+, 3GPP LTE, WiMax™, 5G+, etc., network; etc. In some instances, the mobile network 503 may include a backwards-compatible multi-generational network that supports two or more technology standards.

The client devices 506*a* . . . 506*n* (also referred to individually and collectively as 506) are computing devices having data processing and communication capabilities. In some embodiments, a client device 506 may include a processor (e.g., virtual, physical, etc.), a memory, a power source, a network interface, and/or other software and/or hardware components, such as a display, graphics processor, wireless transceivers, keyboard, camera, sensors, firmware, operating systems, drivers, various physical connection interfaces (e.g., USB, HDMI, etc.). The client devices 506*a* . . . 506*n* may couple to and communicate with one another and the other entities of the system 500 via the network 502 using a wireless and/or wired connection.

Examples of client devices 506 may include, but are not limited to, mobile phones (e.g., feature phones, smart phones, etc.), tablets, laptops, desktops, netbooks, server appliances, servers, virtual machines, TVs, set-top boxes, media streaming devices, portable media players, navigation devices, personal digital assistants, etc. While two or more client devices 506 are depicted in FIG. 5, the system 500 may include any number of client devices 506. In addition, the client devices 506*a* . . . 506*n* may be the same or different types of computing devices.

In the depicted implementation, the client devices 506*a* . . . 506*n* respectively contain instances a client application, such as instances of the ICSA 508*a* . . . 508*n*

(also referred to individually or collectively as 508). The client-side ICSA instances 508 may be storable in a memory (e.g., see FIG. 3A) and executable by a processor (e.g., see FIG. 3A) of a client device 506 to provide for user interaction, receive user input, present information to the user via a display (e.g., see FIG. 3A), and send data to and receive data from the other entities of the system 500 via the network 502. The client devices 506 may further include software operable for making phone calls, video calls, web browsing, messaging, social networking, gaming, capturing digital video, and/or images, authoring documents, etc. In some implementations, the client-side ICSA instances 508 may generate and present the user interfaces depicted in FIGS. 1A-2B based at least in part on information received from the server 522 via the network 502.

The third-party server 516, the server 522, and notification server 530 may include one or more computing devices having data processing, storing, and communication capabilities. For example, these entities 516, 522, and/or 530 may include one or more hardware servers, server arrays, storage devices and/or systems, etc., and/or may be centralized or distributed/cloud-based. In some implementations, these entities 516, 522, and/or 530 may include one or more virtual servers, which operate in a host server environment and access the physical hardware of the host server including, for example, a processor, memory, storage, network interfaces, etc., via an abstraction layer (e.g., a virtual machine manager).

In the depicted implementation, the third-party server 516 may include a third-party application 518 operable to provide various computing functionalities, services, and/or resources, and to send data to and receive data from the other entities of the network 502. For example, the third-party application 518 may provide functionality for user account management, internet searching; social networking; web-based email; blogging; micro-blogging; photo management; video, music and multimedia hosting, distribution, and sharing; business services; news and media distribution; or any combination of the foregoing services. It should be understood that the third-party server 516 is not limited to providing the above-noted services and may include other network-accessible services.

The server 522, as depicted, includes a server-side instance of the ICSA 508b (also simply the ICSA 508) and a search engine 526. The ICSA 508 may include computer logic that, when executed, programs one or more computer processors of the server 522 to perform acts and functionality described herein with respect to the ICSA 508. The search engine 526 includes computer logic that, when executed, programs the one or more computer processors to determine and order search results, such as web search results, and discussed further herein. The search engine 526 may be coupled to an index to store, retrieve, and/or manipulate data stored therein and may be coupled to the ICSA 508, a client application (e.g., ICSA 508a), and/or other components of the system 500 to exchange information therewith.

In some implementations, the ICSA 508 and/or the search engine 526 may require users 512 to be registered to access the functionality provided by it. For example, to access various functionality provided by the ICSA 508 and/or the search engine 526, the ICSA 508 and/or the search engine 526 may require a user 512 to authenticate his/her identity (e.g., by confirming a valid electronic address). In some instances, the ICSA 508 and/or the search engine 526 may interact with a federated identity server (not shown) to register/authenticate users 512. Once registered, these entities 508 and/or the search engine 526 may require a user 512 seeking access to authenticate by inputting credentials in an associated user interface.

In implementations involving receipt, collection, and/or analysis of data, the ICSA 508 first receives user authorization/consent to process such data. Further, in implementations using facial recognition, the ICSA 508 receives explicit user authorization prior to any such processing, and facial recognition techniques are performed and/or face recognition data is collected or stored only upon receiving user authorization. Additional structure and functionality of the server 522, the ICSA 508, and the search engine 526 are described in further detail elsewhere herein.

The notification server 530 may include a push notification service (PNS) operable by the server 528 to forward push notifications to one or more client devices 506 via the network 502. The push notifications may be received by the notification server 530 from the server 522, the third-party server 516, the client devices 506, and/or other entities of the system 500, and may be forwarded to the one or more client devices 506 via the network 502. Some non-limiting examples of push notifications include custom text notifications, badges indicating the number of notifications that await review, and sounds. In some implementations, the server 522 may be coupled to and communicate with the notification server 530 via the network 502 or more directly via signal lines 538.

While FIG. 5 depicts the notification server 530 as a stand-alone entity, it may be included in the other elements of the system 500 including the server 522. Additionally, while only one notification server 530 is depicted, the system 500 may include any number of these entities for load balancing and efficiency. For example, notification servers 530 may distributed by geographic region to facilitate a quicker and more efficient communication between them and the client devices 506 located in those regions.

Any of the computing devices, such as the third-party server 516, the notification server 530, the server 522, and/or the client devices 506 depicted in FIG. 500 may include processor(s) and non-transitory memory(ies), which may store the computer logic as software instructions for execution by the processor(s). Further, the computing devices of the system 500 may include one or more communication unit(s) and data stores, which may be communicatively coupled by a communications bus.

A computer processor may execute software instructions by performing various input/output, logical, and/or mathematical operations. The processor have various computing architectures to process data signals including, for example, a complex instruction set computer (CISC) architecture, a reduced instruction set computer (RISC) architecture, and/or an architecture implementing a combination of instruction sets. The processor may be physical and/or virtual, and may include a single core or plurality of processing units and/or cores. In some implementations, the processor may be capable of generating and providing electronic display signals to a display device (not shown), supporting the display of images, capturing and transmitting images, performing complex tasks including various types of feature extraction and sampling, etc.

A memory may store and provide access to data to the other components of a computer device. In some implementations, a memory may store instructions and/or data that may be executed by the processor(s). For example, a memory may store the ICSA 508 and/or the search engine 526. A memory is also capable of storing other instructions and data, including, for example, an operating system, hardware drivers, other software applications, databases, etc. A memory may be coupled to a bus for communication with the processor(s) and the other components of the computing device.

A memory includes a non-transitory computer-usable (e.g., readable, writeable, etc.) medium, which can be any apparatus or device that can contain, store, communicate, propagate or transport instructions, data, computer programs, software, code, routines, etc., for processing by or in connection with a processor. In some implementations, a memory may include one or more of volatile memory and non-volatile memory. For example, a memory may include, but is not limited, to one or more of a dynamic random access memory (DRAM) device, a static random access memory (SRAM) device, a discrete memory device (e.g., a PROM, FPROM, ROM), a hard disk drive, an optical disk drive (CD, DVD, Blue-ray™, etc.). It should be understood that a memory may be a single device or may include multiple types of devices and configurations.

In some implementations, the ICSA 508, the search engine 526, and various other software operating on the computing devices of the system 500 (e.g., an operating system, device drivers, etc.) may cooperate and communicate via a software communication mechanism implemented in association with a communications bus. The software communication mechanism can include and/or facilitate, for example, inter-process communication, local function or procedure calls, remote procedure calls, an object broker (e.g., CORBA), direct socket communication (e.g., TCP/IP sockets) among software modules, UDP broadcasts and receipts, HTTP connections, etc. Further, any or all of the communication could be secure (e.g., SSH, HTTPS, etc.).

A communication unit may include one or more interface devices (I/F) for wired and/or wireless connectivity with the network 502. For instance, a communication unit may include, but is not limited to, CAT-type interfaces; wireless transceivers for sending and receiving signals using Wi-Fi™, Bluetooth®, cellular communications, etc.; USB interfaces; various combinations thereof; etc. In some implementations, a communication unit can link processor(s) to the network 502, which may in turn be coupled to other processing systems. A communication unit can provide other connections to the network 502 and to other entities of the system 500 using various standard network communication protocols, including, for example, those discussed elsewhere herein.

A data store is an information source for storing and providing access to data. In some implementations, a data store may be coupled to the components of a computing device (local or remote) via a bus and/or network 502 to receive and provide access to data. In some implementations, a data store may store data received from the ICSA 508, the search engine 526, the client devices 506, and the notification server 530 of the system 500, and provide data access to these entities. Examples of the types of data stored by a data store may include, but are not limited to, space object data, post object data, comment data, user profile data, search data, index data, forking data, usage history, notification data, etc. A data store may be included in the server 522 or in another computing device and/or storage system distinct from but coupled to or accessible by the server 522.

A data store can include one or more non-transitory computer-readable mediums for storing the data. In some implementations, a data store may be incorporated with a memory or may be distinct therefrom. In some implementations, a data store may include a database management system (DBMS) operable on a computing device. For example, the DBMS could include a structured query language (SQL) DBMS, a NoSQL DMBS, various combinations thereof, etc. In some instances, the DBMS may store data in multi-dimensional tables comprised of rows and columns, and manipulate, e.g., insert, query, update and/or delete, rows of data using programmatic operations.

It should be understood, however, that in the system 500, various acts and/or functionality may be moved from a server to a client, or vice versa, data may be consolidated into a single data store or further segmented into additional data stores, and some embodiments may include additional or fewer computing devices, services, and/or networks, and may implement various functionality client or server-side. Further, various entities of the system may be integrated into a single computing device or system or divided into additional computing devices or systems, etc.

Figure 6:
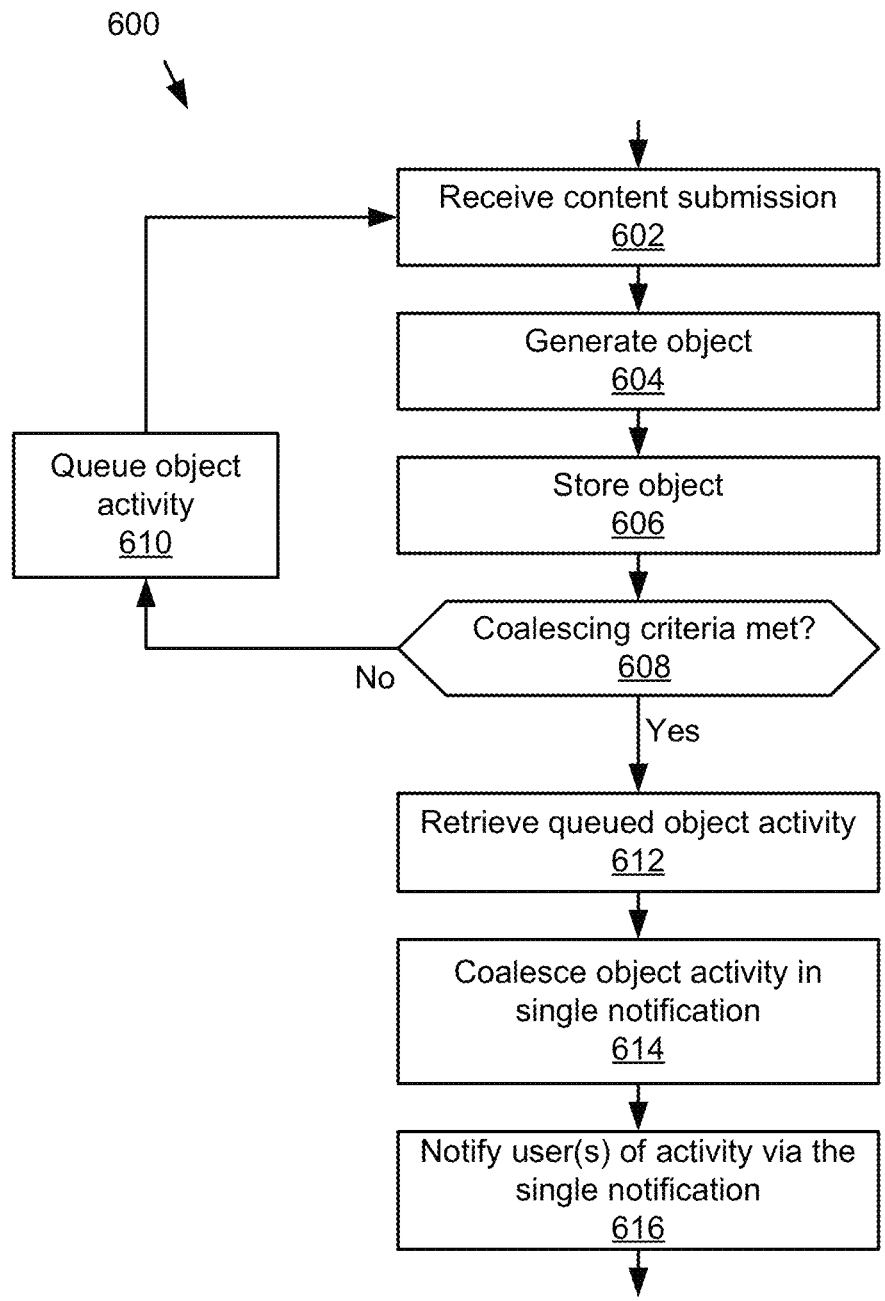
FIG. 6 is a flowchart of an example method for coalescing digital content item activity.

FIG. 6 is a flowchart of an example method 600 for coalescing digital content item activity. In block 602, the method 600 receives a content submission. As discussed elsewhere herein, users using the digital content item interaction interfaces may submit various different digital content items to space object for interaction with by other users. The ICSA 508 may generate 604 and store 606 a corresponding object based on the submitted content, such as a post object or comment object. The ICSA 508 may, for example, generate a unique identifier for object embodying the submitted content, format the content in a manner compatible with the object, and store the object in the data store.

In block 608, the ICSA 508 determines whether a coalescence criteria has been met. If yes, the method 600 proceeds to block 612. If no, the ICSA 508 queues the object activity in block 610 and returns to block 602 and awaits receipt of further content and/or ends and is again initialized upon receipt of subsequent content. In queuing the activity, ICSA 508 may store queuing data in the data store referencing the object IDs of the objects for which the ICSA 508 has delayed notifying a target user based on the coalescing criteria.

In block 612, the ICSA 508 retrieves the queued object activity from the data store, and in block 614, coalesces the object activity in a single notification and then sends, in block 616, notifies user(s) (e.g., the target user) of the activity via the single notification.

In some implementations, the ICSA 508 may render an activity interface presenting the single notification. The single notification may be presented in conjunction with other prior or concurrent coalesced or coalesced notifications also generated by the ICSA 508. In some cases, prior to rendering, on the client device associated with the user, the activity interface, the ICSA 508 may rank the coalesced items based on one or more coalesced item ranking criteria and may determine a presentation ordering of the items within the single notification based on the ranking of each item.

As an illustrative example, the ICSA 508 may receive a first comment from a first user. The first comment may be received from a first client device with which the first user is associated. In some implementations, the first user may be using a first instance of the ICSA 508, and the first comment may be received from the first instance of the ICSA 508. The first comment may reference a particular post object associated with the first space object. The particular post object may be owned by another user (e.g., a third user for this example). The third user may have created any number of space objects to organize various content of interest to the third user and/or for collaboration on with other users. For example, the particular post object may be one of two or more space objects representing distinct virtual spaces each including one or more post objects.

Further, in this example, the ICSA 508 may receive a second comment from a second user. The second comment may be received from a second client device with which the second user is associated. In some implementations, the second user may be using a second instance of the ICSA 508, and the second comment may be received from the second instance of the ICSA 508. The second comment may also reference the particular post object associated with the first space object from the two or more space objects.

While in this example two comments are received, it should be understood that any activity associated with the space object may be queued as object activity in block 610, such as changes to the topic or other metadata of the space object, deletions of comments or post objects from the space object, additions of comments or post objects to the space object, and/or any other activity. Further, more than two instances of activity may be queued as object activity and later coalesced in block 612 and the single notification.

Continuing the example, ICSA 508 coalesces the first comment and second comment in the single notification based on one or more coalescing criteria. For instance, the ICSA 508 may determine in block 608 that at least one attribute of the first comment and at least one attribute of the second comment satisfies one or more of a timeframe, an attribute of the first space object, and an attribute of the particular post object. In some example cases, the at least one attribute of the first comment and the at least one attribute of the second comment both satisfy the attribute of the particular post object by being uniquely associated with the particular post object in a data store. In some example cases, the at least one attribute of the first comment and the at least one attribute of the second comment both satisfy the attribute of the first space object by satisfying the timeframe. Other variations are also possible as discussed further elsewhere herein.

The coalescing criteria may include delay criteria (e.g., a period of time to delay, a minimum number of activity instances, etc.), and the ICSA 508 may delay, based on one or more delay criteria, sending of a notification indicating the first comment is received to allow time for further (e.g., the second comment) comments to be received, and the ICSA 508 may generate the single notification coalescing the first comment and the second comment responsive to the delay criteria being satisfied (e.g., a certain amount of time passing despite what additional submissions are received; after a certain number of submissions have been received for all space objects, a given post object, a given space object, etc.; after either the passage of a certain amount of time or a number of submission have been received; etc.).

The ICSA 508 may render an activity interface visually displaying the single notification coalescing the first comment in the second comment to the third user to notify the third user, via the single notification, of the first, and the second comment received from the first user and the second user in association with the particular post object. In this example, the third user is a user other than the first user and the second user. For example, the third user may be the user who created the space object and invited the first user in the second user to submit content in association with the space object.

Continuing the illustrative example, responsive to coalescing the first comment and the second comment in the single notification based on the one or more coalescing criteria, the ICSA 508 may send the single notification to a third instance of the interactive content sharing application for presentation to the third user in the activity interface. In some example cases, sending the single notification may include sending a push notification via a wireless network to a client device of the third user, and the activity interface may be rendered by one of an operating system of the client device of the third user, the third instance of the interactive content sharing application executing on the client device of the third user, and a third-party application executing on the client device of the third user.

The ICSA 508 may rank the first comment and the second comment of the single notification based on one or more coalesced item ranking criteria and determine, for the activity interface, a presentational ordering of the first comment and the second comment within the single notification. For instance, the one or more coalesced item ranking criteria may include a recency of the first comment and the second comment.

In some cases, the ICSA 508 may notify users, such as the third user, by presenting a space interface associated with a space object. The space interface may include a content region displaying one or more digital content items of the particular post object and include a user-selectable activity element selectable by third user using an input device of the third client device to view the activity interface including the single notification coalescing the first comment and the second comment, as discussed elsewhere herein.

To ease description, some elements described or claimed herein are referred to using the labels first, second, third, etc. These labels (e.g., first input, second input, third input, etc.) are intended to help to distinguish the elements but do not necessarily imply any particular order or ranking unless indicated otherwise.

Further, it should be understood that the methods described herein are provided by way of example, and that variations and combinations of these methods, as well as other methods, are contemplated. For example, in some embodiments, the methods or various portions thereof may be concatenated, divided, or combined to produce further methods which are encompassed by the present disclosure. Additionally, it should be understood that various operations in the methods may be iterative, and thus repeated as many times as necessary generate the results described herein. Further the ordering of the operations in the methods is provided by way of example and it should be understood that various operations may occur earlier and/or later in the method without departing from the scope thereof.

In the above description, for purposes of explanation, numerous specific details are set forth in order to provide a thorough understanding of the present disclosure. However, it should be understood that the technology described herein can be practiced without these specific details. Further, various systems, devices, and structures are shown in block diagram form in order to avoid obscuring the description. For instance, various implementations are described as having particular hardware, software, and user interfaces. However, the present disclosure applies to any type of computing device that can receive data and commands, and to any peripheral devices providing services.

In some instances, various implementations may be presented herein in terms of algorithms and symbolic representations of operations on data bits within a computer memory. An algorithm is here, and generally, conceived to be a self-consistent set of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout this disclosure, discussions utilizing terms including "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Various implementations described herein may relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, including, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The technology described herein can take the form of a hardware implementation, a software implementation, or implementations containing both hardware and software elements. For instance, the technology may be implemented in software, which includes but is not limited to firmware, resident software, microcode, etc. Furthermore, the technology can take the form of a computer program product accessible from a computer-usable or computer-readable medium providing program code for use by or in connection with a computer or any instruction execution system. For the purposes of this description, a computer-usable or computer readable medium can be any non-transitory storage apparatus that can contain, store, communicate, propagate, or transport the program for use by or in connection with the instruction execution system, apparatus, or device.

A data processing system suitable for storing and/or executing program code may include at least one processor coupled directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems, storage devices, remote printers, etc., through intervening private and/or public networks. Wireless (e.g., Wi-Fi™) transceivers, Ethernet adapters, and modems, are just a few examples of network adapters. The private and public networks may have any number of configurations and/or topologies. Data may be transmitted between these devices via the networks using a variety of different communication protocols including, for example, various Internet layer, transport layer, or application layer protocols. For example, data may be transmitted via the networks using transmission control protocol/Internet protocol (TCP/IP), user datagram protocol (UDP), transmission control protocol (TCP), hypertext transfer protocol (HTTP), secure hypertext transfer protocol (HTTPS), dynamic adaptive streaming over HTTP (DASH), real-time streaming protocol (RTSP), real-time transport protocol (RTP) and the real-time transport control protocol (RTCP), voice over Internet protocol (VOIP), file transfer protocol (FTP), WebSocket (WS), wireless access protocol (WAP), various messaging protocols (SMS, MMS, XMS, IMAP, SMTP, POP, WebDAV, etc.), or other known protocols.

Finally, the structure, algorithms, and/or interfaces presented herein are not inherently related to any particular computer or other apparatus. Various general-purpose systems may be used with programs in accordance with the teachings herein, or it may prove convenient to construct more specialized apparatus to perform the required method blocks. The required structure for a variety of these systems will appear from the description above. In addition, the specification is not described with reference to any particular programming language. It will be appreciated that a variety of programming languages may be used to implement the teachings of the specification as described herein.

The foregoing description has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies and other aspects are not mandatory or significant, and the mechanisms that implement the specification or its features may have different names, divisions and/or formats.

Furthermore, the modules, routines, features, attributes, methodologies and other aspects of the disclosure can be implemented as software, hardware, firmware, or any combination of the foregoing. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future. Additionally, the disclosure is in no way limited to implementation in any specific programming language, or for any specific operating system or environment. Accordingly, the disclosure is intended to be illustrative, but not limiting, of the scope of the subject matter set forth in the following claims.

What is claimed is:

1. A computer-implemented method comprising: receiving a first input, from a user via an input device of a client device, the first input including an instruction to fork content from a source space embodying a first virtual content sharing environment associated with a first topic; receiving a second input, from the user via the input device of the client device, describing a destination space embodying a second virtual content sharing environment associated with a second topic; determining a set of digital content items to move from the source space embodying the first virtual content sharing environment associated with the first topic to the destination space embodying the second virtual content sharing environment associated with the second topic; populating the destination space, embodying the second virtual content sharing environment associated with the second topic, with the set of digital content items; removing from the source space, embodying the first virtual content sharing environment associated with the first topic, the set of digital content items; storing forking data reflecting the moved set of digital content items; after the move of the set of digital content items to the destination space, receiving a new content item in the destination space submitted by a second user receiving a third input from the user to undo the move of the moved set of digital content items; and responsive to receiving the third input to undo the move of the moved set of digital content items, moving the moved set of digital content items back to and the new content item to the source space.

2. The computer-implemented method of claim 1, further comprising:
   rendering, for presentation on a plurality of displays of a plurality of client devices, digital content item interaction (DCII) interfaces comprising a first space object in which digital content items are postable by users, the first space object reflecting the source space; and
   receiving, from each of the client devices of the plurality via a user interaction with the DCII interfaces, one or more digital content items associated with the first space object that describe a third topic different from the first topic of the first space object, the one or more digital content items comprising the set of digital content items to move, wherein the second topic of the destination space is related to the third topic of the one or more digital content items.

3. The computer-implemented method of claim 1, wherein the set of digital content items include one or more of a post object and a comment object unrelated to the first topic.

4. The computer-implemented method of claim 1, further comprising:
   rendering a content item selection interface presenting digital content items included in the source space and including user-selectable interface elements for identifying which specific digital content items to move; and
   receiving, from the user via the input device of the client device, a fourth input selecting the set of digital content items to move from among the digital content items presented in the content item selection interface, wherein the set of digital content items to move is determined based on the fourth input.

5. The computer-implemented method of claim 4, wherein the set of digital content items to move includes a post object and one or more comments submitted responsive to posting of the post object.

6. The computer-implemented method of claim 1, wherein receiving the second input describing the destination space includes rendering for display a space creation interface providing user interface elements to create the destination space including an interface element for inputting the second topic and for pre-populating the destination space with digital content items.

7. The computer-implemented method of claim 6, further comprising:
   receiving, via an interaction by the user with the space creation interface using the input device, a fourth input defining the second topic for the destination space;
   generating a destination space object embodying the destination space using the fourth input defining the second topic for the destination space; and
   storing the destination space object in a non-transitory data store.

8. The computer-implemented method of claim 1, wherein receiving the second input describing the destination space includes rendering for display a space selection interface providing user interface elements to select the destination space from among one or more pre-existing spaces and for pre-populating the destination space with digital content items.

9. The computer-implemented method of claim 1, further comprising:
   storing authorization data granting permission to a set of users to access the destination space and to post digital content items to the destination space, the set of users already having permission to post digital content items to the source space.

10. A computer system comprising: one or more computer processors; one or more computer memories storing instructions that, when executed by the one or more computer processors, cause the computer system to perform operations comprising: receiving a first input from a user via an input device, the first input including an instruction to fork content from a source space embodying a first virtual content sharing environment associated with a first topic; receiving a second input, from the user via the input device, describing a destination space embodying a second virtual content sharing environment associated with a second topic; determining a set of digital content items to move from the source space embodying the first virtual content sharing environment associated with the first topic to the destination space embodying the second virtual content sharing environment associated with the second topic; populating the destination space, embodying the second virtual content sharing environment associated with the second topic, with the set of digital content items; removing from the source space, embodying the first virtual content sharing environment associated with the first topic, the set of digital content items; storing forking data reflecting the moved set of digital content items; after the move of the set of digital content items to the destination space, receiving a new content item in the destination space submitted by a second user receiving a third input from the user to undo the move of the moved set of digital content items; and responsive to receiving the third input to undo the move of the moved set of digital content items, moving the moved set of digital content items back to and the new content item to the source space.

11. The computer system of claim 10, wherein the instructions, when executed by the one or more computer processors, further cause the computer system to perform operations comprising:
   rendering, for presentation on a plurality of displays, digital content item interaction (DCII) interfaces comprising a first space object in which digital content items are postable by users, the first space object reflecting the source space; and
   receiving, via a user interaction with the DCII interfaces, one or more digital content items associated with the first space object that describe a third topic different from the first topic of the first space object, the one or more digital content items comprising the set of digital content items to move, wherein the second topic of the destination space is related to the third topic of the one or more digital content items.

12. The computer system of claim 10, wherein the set of digital content items include one or more of a post object and a comment object unrelated to the first topic.

13. The computer system of claim 10, wherein the instructions, when executed by the one or more computer processors, further cause the computer system to perform operations comprising:
rendering a content item selection interface presenting digital content items included in the source space and including user-selectable interface elements for identifying which specific digital content items to move; and
receiving, from the user via the input device, a fourth input selecting the set of digital content items to move from among the digital content items presented in the content item selection interface, wherein the set of digital content items to move is determined based on the fourth input.

14. The computer system of claim 13, wherein the set of digital content items to move includes a post object and one or more comments submitted responsive to posting of the post object.

15. The computer system of claim 10, wherein receiving the second input describing the destination space includes rendering for display a space creation interface providing user interface elements to create the destination space including an interface element for inputting the second topic and for pre-populating the destination space with digital content items.

16. The computer system of claim 15, wherein the instructions, when executed by the one or more computer processors, further cause the computer system to perform operations comprising:
receiving, via an interaction by the user with the space creation interface using the input device, a fourth input defining the second topic for the destination space;
generating a destination space object embodying the destination space using the fourth input defining the second topic for the destination space; and
storing the destination space object in a non-transitory data store.

17. The computer system of claim 10, wherein receiving the second input describing the destination space includes rendering for display a space selection interface providing user interface elements to select the destination space from among one or more pre-existing spaces and for pre-populating the destination space with digital content items.

18. The computer system of claim 10, wherein
storing authorization data granting permission to a set of users to access the destination space and to post digital content items to the destination space, the set of users already having permission to post digital content items to the source space.

19. A non-transitory computer-readable medium storing instructions that, when executed by one or more computer processors, cause the one or more computer processors to perform operations comprising: receiving a first input from a user via an input device, the first input including an instruction to fork content from a source space embodying a first virtual content sharing environment associated with a first topic; receiving a second input, from the user via the input device, describing a destination space embodying a second virtual content sharing environment associated with a second topic; determining a set of digital content items to move from the source space embodying the first virtual content sharing environment associated with the first topic to the destination space embodying the second virtual content sharing environment associated with the second topic; populating the destination space, embodying the second virtual content sharing environment associated with the second topic, with the set of digital content items; removing from the source space, embodying the first virtual content sharing environment associated with the first topic, the set of digital content items; storing forking data reflecting the moved set of digital content items; after the move of the set of digital content items to the destination space, receiving a new content item in the destination space submitted by a second user receiving a third input from the user to undo the move of the moved set of digital content items; and responsive to receiving the third input to undo the move of the moved set of digital content items, moving the moved set of digital content items back to and the new content item to the source space.

20. The non-transitory computer-readable medium of claim 19, wherein the instructions, when executed by the one or more computer processors, further cause the one or more computer processors to perform operations comprising:
rendering, for presentation on a plurality of displays, digital content item interaction (DCII) interfaces comprising a first space object in which digital content items are postable by users, the first space object reflecting the source space; and
receiving, via a user interaction with the DCII interfaces, one or more digital content items associated with the first space object that describe a third topic different from the first topic of the first space object, the one or more digital content items comprising the set of digital content items to move, wherein the second topic of the destination space is related to the third topic of the one or more digital content items.

* * * * *

UNITED STATES PATENT AND TRADEMARK OFFICE
CERTIFICATE OF CORRECTION

PATENT NO. : 10,409,463 B2
APPLICATION NO. : 15/396386
DATED : September 10, 2019
INVENTOR(S) : Chen et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 201 days.

Signed and Sealed this
Thirtieth Day of June, 2020

Andrei Iancu
*Director of the United States Patent and Trademark Office*